United States Patent [19]

Zenda

[11] Patent Number: 5,559,525
[45] Date of Patent: Sep. 24, 1996

[54] FLAT PANEL DISPLAY CONTROL SYSTEM

[75] Inventor: Hiroki Zenda, Tokyo, Japan

[73] Assignee: Kabushiki Kaisha Toshiba, Kawasaki, Japan

[21] Appl. No.: 425,774

[22] Filed: Apr. 20, 1995

Related U.S. Application Data

[63] Continuation of Ser. No. 229,137, Apr. 18, 1994, abandoned, which is a continuation of Ser. No. 953,152, Sep. 29, 1992, abandoned.

[30] Foreign Application Priority Data

Sep. 30, 1991 [JP] Japan ..................... 3-250684

[51] Int. Cl.$^6$ .................................................. G09G 5/00
[52] U.S. Cl. ........................................... 345/1; 345/3
[58] Field of Search ............................. 345/1, 3; 348/553

[56] References Cited

U.S. PATENT DOCUMENTS

| | | | |
|---|---|---|---|
| 4,425,586 | 1/1984 | Miller | 358/903 X |
| 4,684,935 | 8/1987 | Fujisaku et al. | 340/717 |
| 4,716,463 | 12/1987 | Stacy et al. | 358/903 X |
| 4,760,387 | 7/1988 | Ishii et al. | 340/717 X |
| 4,862,156 | 8/1989 | Westberg et al. | |
| 4,922,448 | 5/1990 | Kunieda et al. | 340/717 X |
| 4,980,678 | 12/1990 | Zenda | 340/716 |
| 5,111,296 | 5/1992 | Duffield et al. | 358/903 X |

FOREIGN PATENT DOCUMENTS

| | | |
|---|---|---|
| 0359234A2 | 3/1990 | European Pat. Off. . |
| 0359236A2 | 3/1990 | European Pat. Off. . |
| 0419904A2 | 4/1991 | European Pat. Off. . |

*Primary Examiner*—Ulysses Weldon
*Attorney, Agent, or Firm*—Finnegan, Henderson, Farabow, Garrett & Dunner, L.L.P.

[57] ABSTRACT

A portable computer includes a flat panel display unit, a first graphics subsystem used for displaying data on the flat panel display unit, a connector for connecting an optional second graphics subsystem to the portable computer, and a switch circuit for switching the operation of the first graphics subsystem to that of the second graphics subsystem or vice versa. When the second graphics subsystem is connected to the portable computer, the switch circuit switches the operation of the first graphics subsystem to that of the second graphics subsystem, whereby data from the second graphics subsystem are displayed on the flat panel display unit.

13 Claims, 29 Drawing Sheets

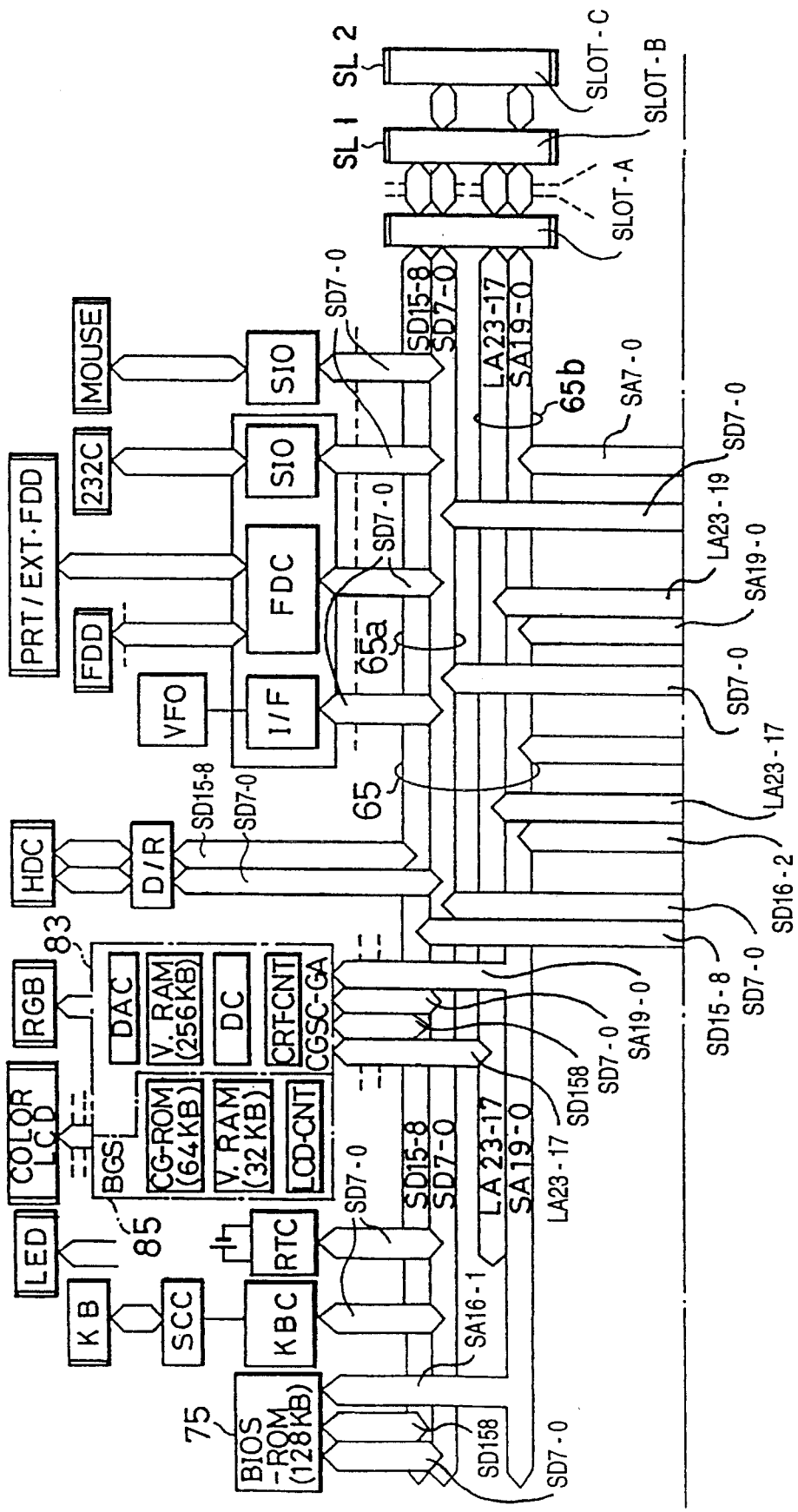
F I G. 1A

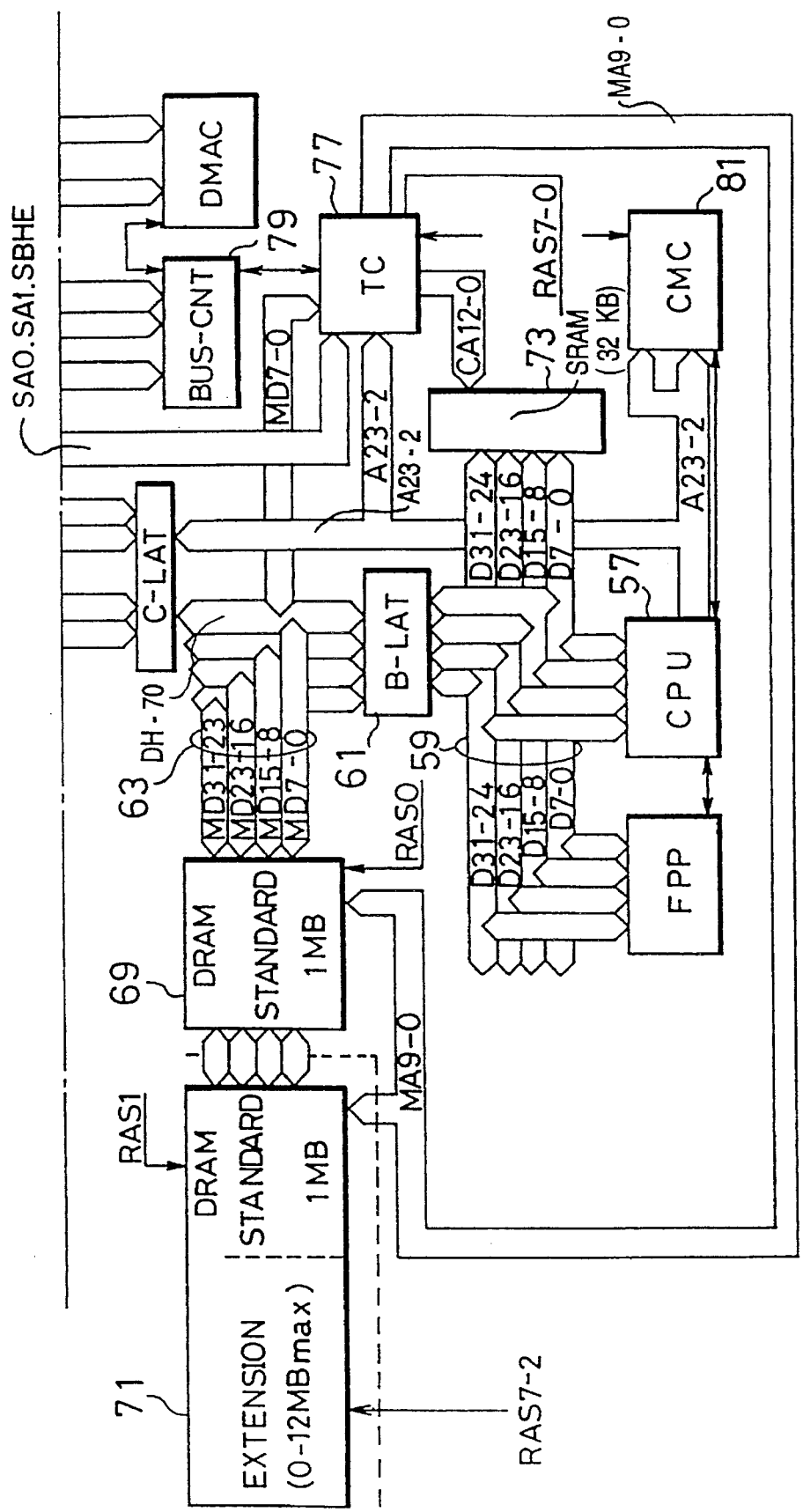
F I G. 1B

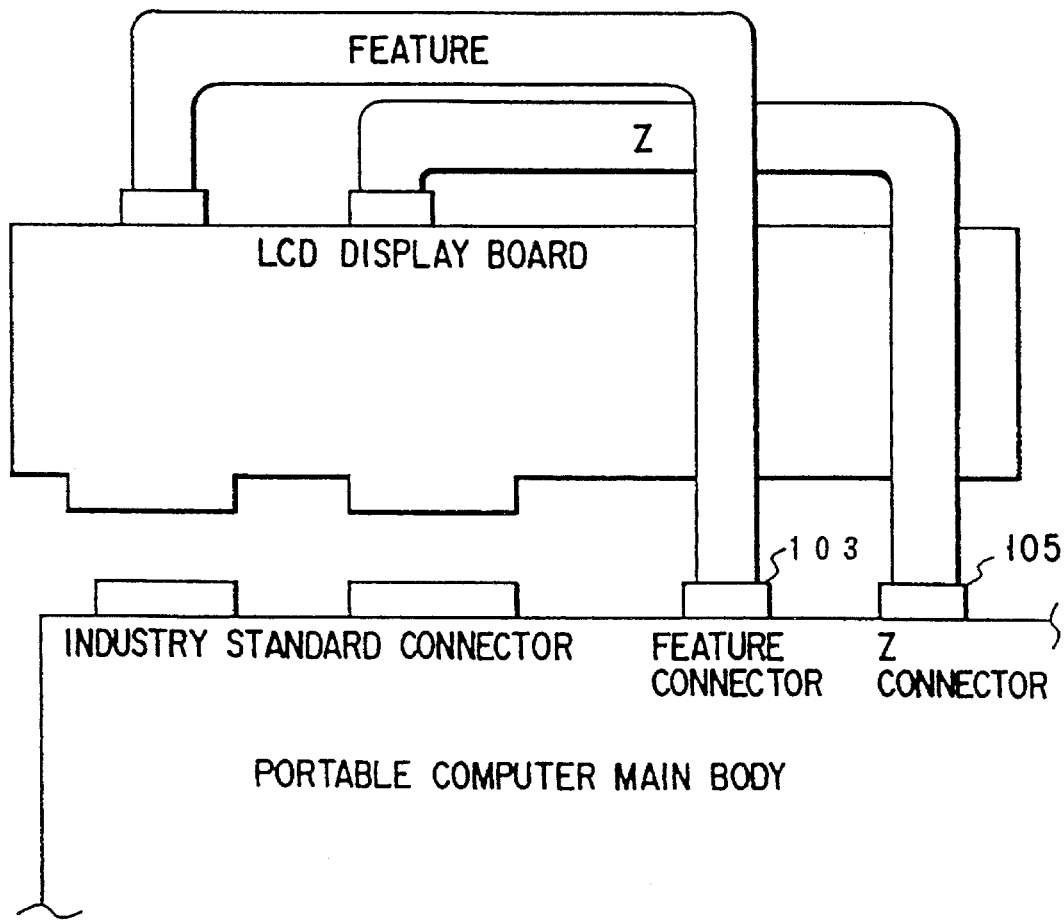
F I G. 2A

| PIN NO. | DENOMI-NATION | FUNCTION | PIN NO. | DENOMI-NATION | FUNCTION |
|---|---|---|---|---|---|
| 1 | FEASEN | sense bit | 2 | P 0 | Color Bit 0 (LSB) |
| 3 | GND | — | 4 | P 1 | Color Bit 1 |
| 5 | GND | — | 6 | P 2 | Color Bit 2 |
| 7 | N. C. | | 8 | P 3 | Color Bit 3 |
| 9 | N. C. | | 10 | P 4 | Color Bit 4 |
| 11 | N. C. | | 12 | P 5 | Color Bit 5 |
| 13 | N. C. | | 14 | P 6 | Color Bit 6 |
| 15 | GND | — | 16 | P 7 | Color Bit 7 (MSB) |
| 17 | GND | — | 18 | PCLK | PRIME CLOCK |
| 19 | GND | — | 20 | FR | DISPLAY ENABLE SIGNAL |
| 21 | GND | — | 22 | LP | HORIZONTAL SYNCHRONIZING SIGNAL |
| 23 | N. C. | | 24 | FP | VERTICAL SYNCHRONIZING SIGNAL |
| 25 | N. C. | | 26 | GND | — |

FIG. 5

| PIN NO. | DENOMI-NATION | FUNCTION | PIN NO. | DENOMI-NATION | FUNCTION |
|---|---|---|---|---|---|
| 1 | R1 | Red Bit 1 | 2 | R0 | Red Bit 0 (LSB) |
| 3 | R2 | Red Bit 2 | 4 | GND | — |
| 5 | GND | — | 6 | R3 | Red Bit 3 (LSB) |
| 7 | R5 | Red Bit 5 (MSB) | 8 | R4 | Red Bit 4 (LSB) |
| 9 | G0 | Green Bit 0 (LSB) | 10 | GND | — |
| 11 | GND | — | 12 | G1 | Green Bit 1 |
| 13 | G3 | Green Bit 3 | 14 | G2 | Green Bit 2 |
| 15 | G4 | Green Bit 4 | 16 | GND | — |
| 17 | GND | — | 18 | G5 | Green Bit 5 (MSB) |
| 19 | B1 | Blue Bit 1 | 20 | B0 | Blue Bit 0 (LSB) |
| 21 | B2 | Blue Bit 2 | 22 | GND | — |
| 23 | GND | — | 24 | B3 | Blue Bit 3 |
| 25 | B5 | Blue Bit 5 (MSB) | 26 | B4 | Blue Bit 4 |
| 27 | LLP | H sync | 28 | GND | — |
| 29 | GND | — | 30 | LFP | V sync |
| 31 | LWCLK | Enable signal | 32 | GND | — |
| 33 | ZENSEN | CHANGEOVER SIGNAL | 34 | LPCLK | VIDEO CLOCK |

FIG. 6

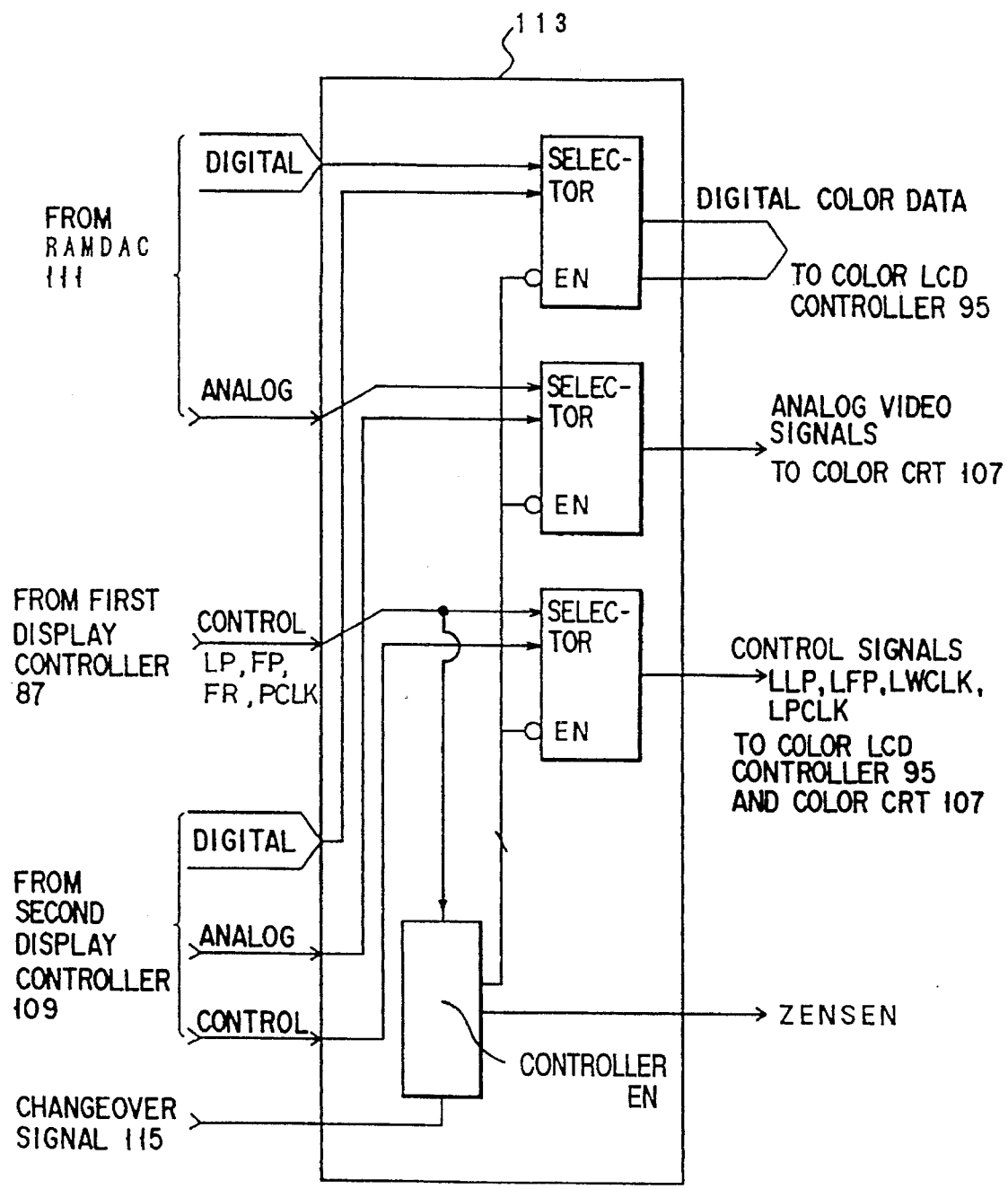
F I G. 7

LINE 94 OUTPUT

RAMDAC 93 OUTPUT

ZENSEN SIGNAL

CLOCK PCLK

SELECTOR 113 OUTPUT

640×480 t1 : 525H (16.683ms)
t2 :   2H ( 0.064ms)
t3 :  24H ( 0.763ms)
t4 :   8H ( 0.254ms)
t5 : 480H (15.253ms)
t6 :   8H ( 0.254ms)
t7 :   3H ( 0.095ms)
1H (1HSYNC)= 31.778us

640×350/720×350 t1 : 449H (14.268ms)
t2 :   2H ( 0.064ms)
t3 :  53H ( 1.684ms)
t4 :   6H ( 0.191ms)
t5 : 350H (11.122ms)
t6 :   6H ( 0.191ms)
t7 :  32H ( 1.017ms)
1H (1HSYNC) = 31.778us

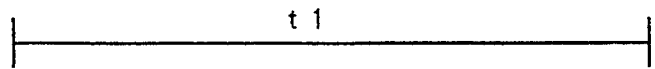
FIG. 14A {LP
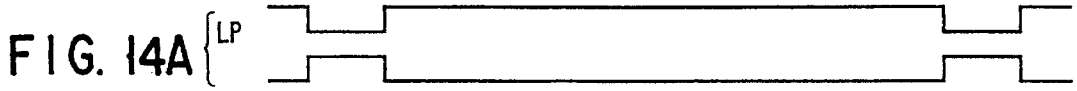
FIG. 14B FR
FIG. 14C P7-0
t1: 100C (31.778us)
t2: 12C (3.813us)
t3: 5C (1.589us)
t4: 1C (0.318us)
t5: 80C (25.422us)
t6: 1C (0.318us)
t7: 1C (0.318us)
IC (1 Character)=8 Dot(25.175MHz)or 9 Dot(28.322MHz)=318ns
FIG. 14D FR
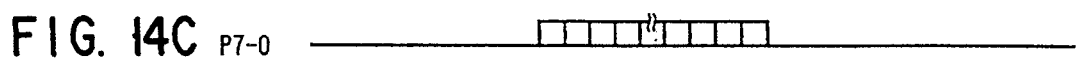
FIG. 14E P7-0 (80 col.)
FIG. 14F PCLK
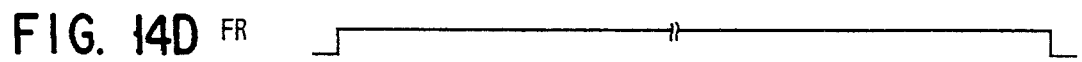
1D=Dot(25.175MHz)=39.7ns
or (28.322MHz)=35.3ns
FIG. 14G FR
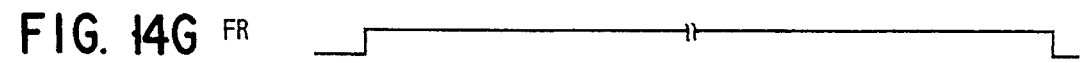
FIG. 14H P7-0 (40 col.)
FIG. 14I PCLK
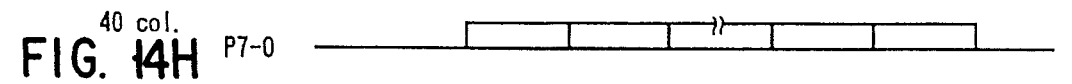
1D=Dot(25.175MHz/2)=79.4ns
or (28.322MHz/2)=70.6ns 640×480
FIG. 15A FP
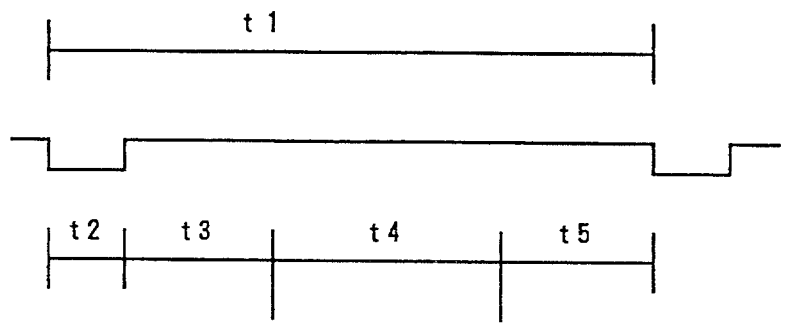
FIG. 15B LP
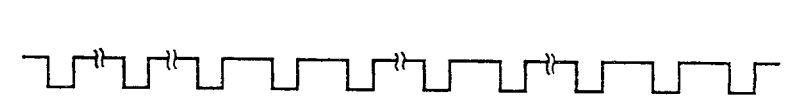
FIG. 15C FR
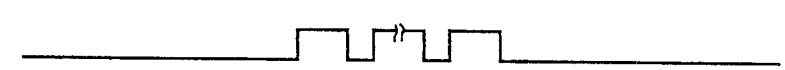
FIG. 15D P7-0
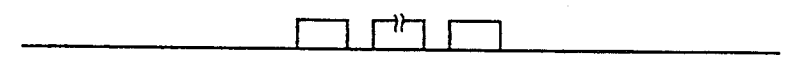
t1 : 525H (16.683ms)
t2 :   2H ( 0.064ms)
t3 :  32H ( 1.017ms)
t4 : 480H (15.253ms)
t5 :  11H ( 0.350ms)
1H (1HSYNC) = 31.778us 640×400
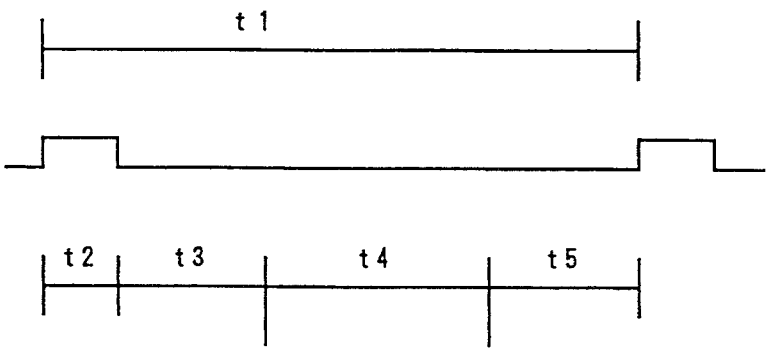
FIG. 16A  FP
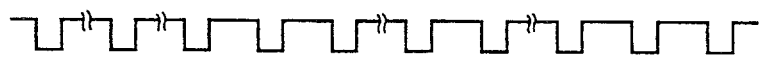
FIG. 16B  LP
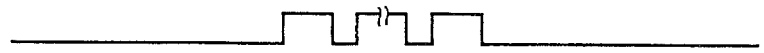
FIG. 16C  FR
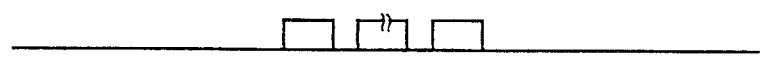
FIG. 16D  P7-0
t1: 449H (14.268ms)
t2:   2H ( 0.064ms)
t3:  34H ( 1.080ms)
t4: 400H (12.711ms)
t5:  13H ( 0.413ms)
1H (1HSYNC)= 31.778us 640×350
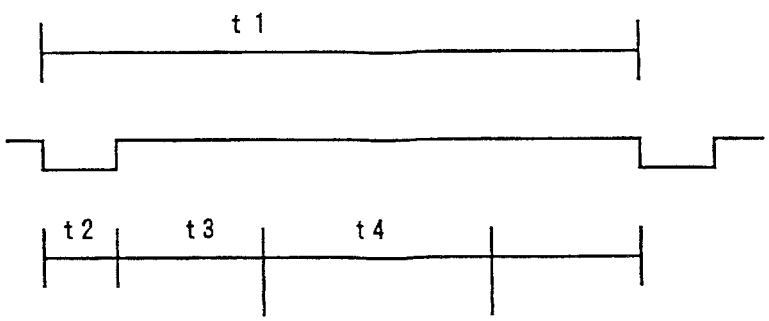
FIG. 17A  FP
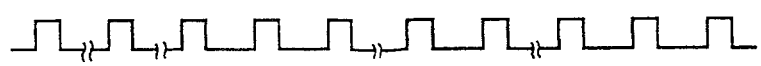
FIG. 17B  LP
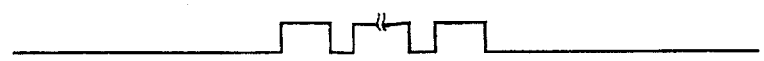
FIG. 17C  FR
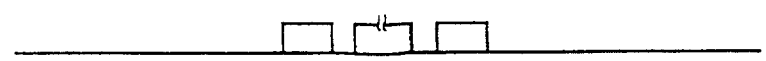
FIG. 17D  P7-0
t1: 449H (14.268ms)
t2:   2H ( 0.064ms)
t3:  59H ( 1.875ms)
t4: 350H (11.122ms)
t5:  38H ( 1.208ms)
1H (1HSYNC)= 31.778us FIG. 18A LP 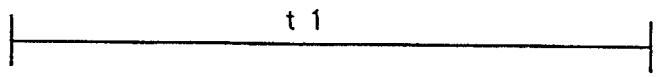
FIG. 18B FR 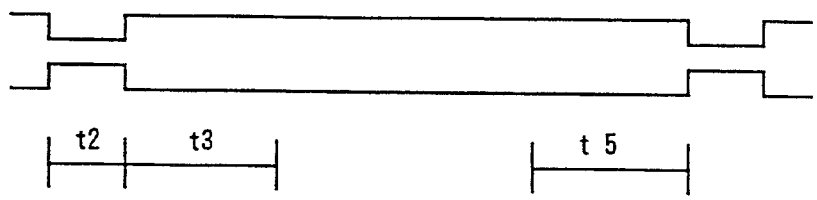
FIG. 18C P7-0 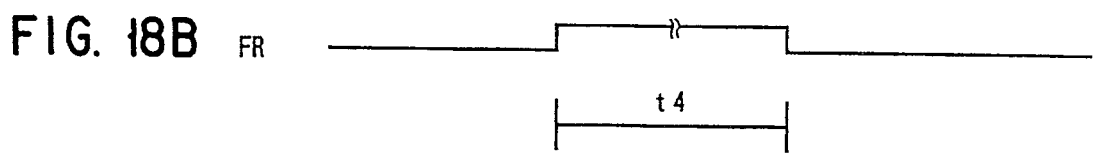
```
t 1 : 1 0 0 C ( 3 1. 7 7 8 u s )
t 2 :     1 2 C (   3. 8 1 3 u s )
t 3 :       6 C (   1. 9 0 7 u s )
t 4 :     8 0 C ( 2 5. 4 2 2 u s )
t 5 :       2 C (   0. 6 3 6 u s )
1C (1 Character)=8 Dot(25.175MHz)=318ns
```
FIG. 18D FR 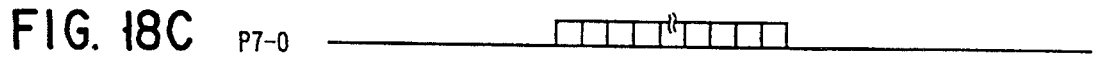
FIG. 18E P7-0 (80 col.) 
FIG. 18F PCLK 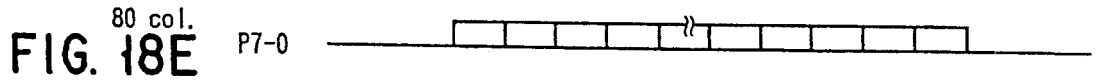
1D=Dot(25.175MHz)=39.7ns
FIG. 18G FR 
FIG. 18H P7-0 (40 col.) 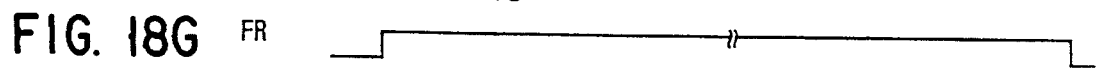
FIG. 18I PCLK 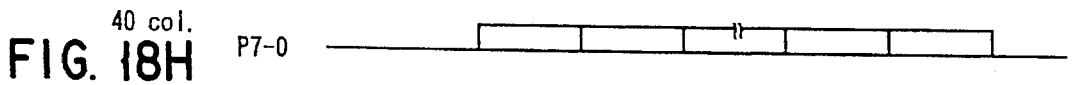
1D=Dot(25.175MHz)=39.7ns

Z CONNECTOR TIMING CHART
640×480
FIG. 19A  LFP
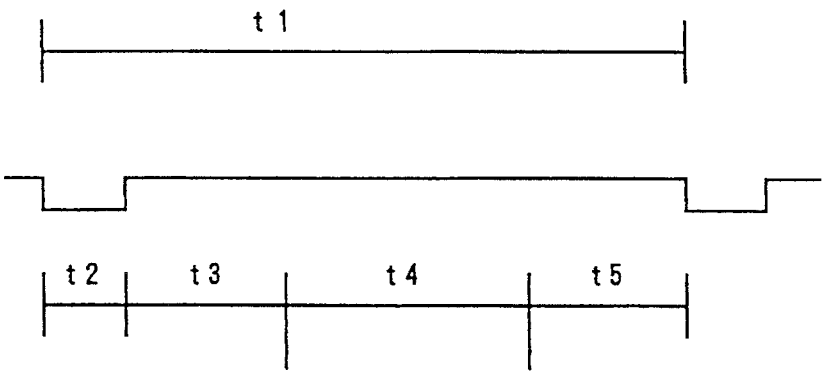
FIG. 19B  LLP
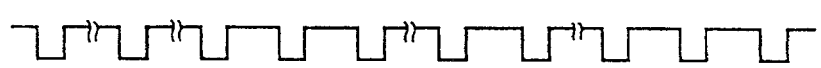
FIG. 19C  LWCLK
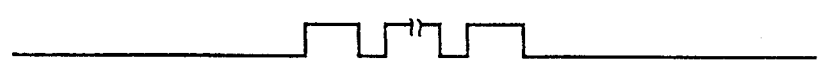
FIG. 19D  COLOR DATA
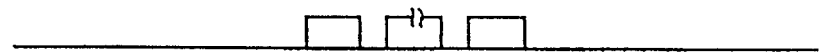
t1 : 525H (16.683ms)
t2 :   2H ( 0.064ms)
t3 :  32H ( 1.017ms)
t4 : 480H (15.253ms)
t5 :  11H ( 0.350ms)
1H (1HSYNC) = 31.778us

Z CONNECTOR TIMING CHART
640×400
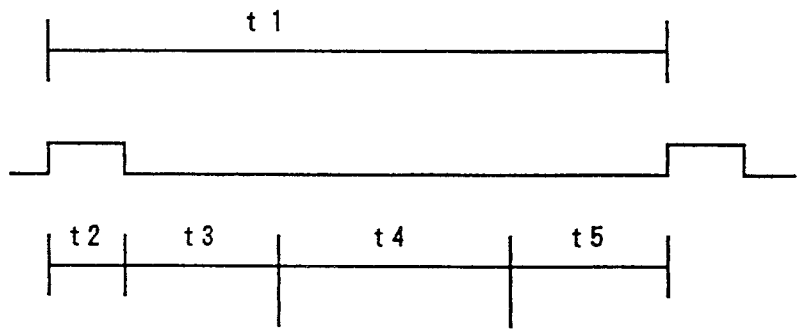
F I G. 20A  LFP
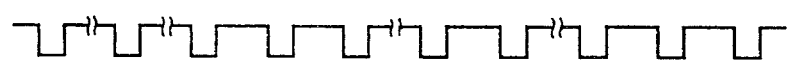
F I G. 20B  LLP
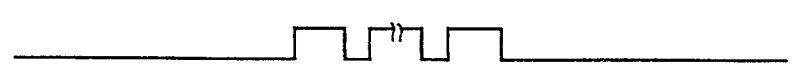
F I G. 20C  LWCLK
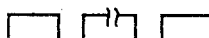
COLOR DATA
F I G. 20D
t1: 449H (14.268ms)
t2:   2H ( 0.064ms)
t3:  34H ( 1.080ms)
t4: 400H (12.711ms)
t5:  13H ( 0.413ms)
1H (1HSYNC)= 31.778us

Z CONNECTOR TIMING CHART
640×350
FIG. 21A  LFP
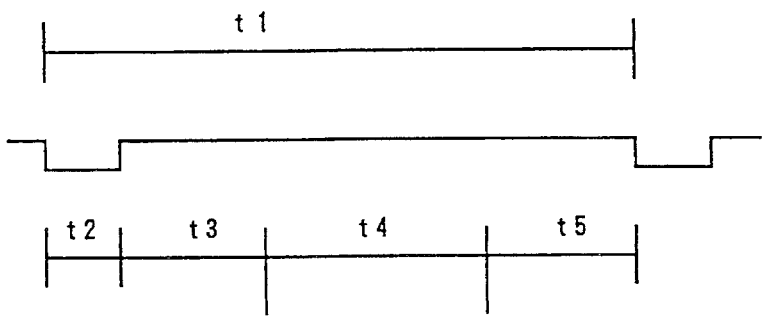
FIG. 21B  LLP
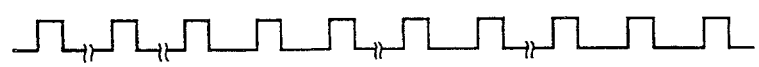
FIG. 21C  LWCLK
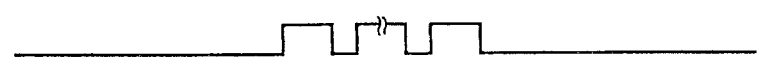
FIG. 21D  COLOR DATA
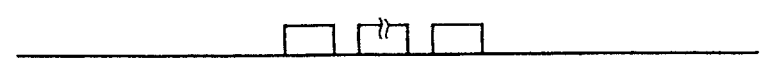
t1 : 449H (14.268ms)
t2 :   2H ( 0.064ms)
t3 :  59H ( 1.875ms)
t4 : 350H (11.122ms)
t5 :  38H ( 1.208ms)
1H (1HSYNC) = 31.778us Z CONNECTOR TIMING CHART
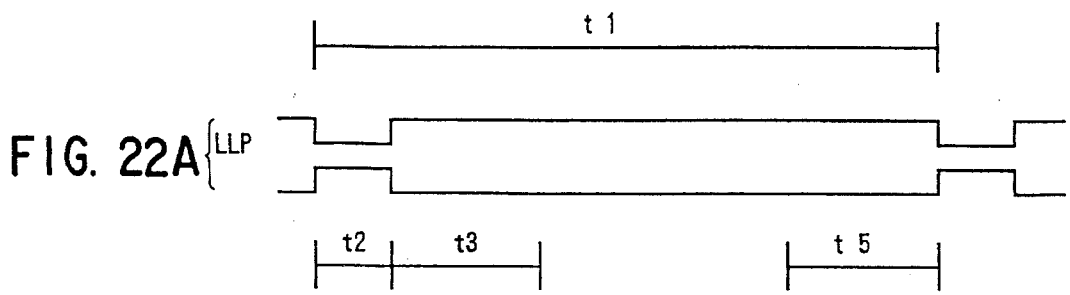
FIG. 22A LLP
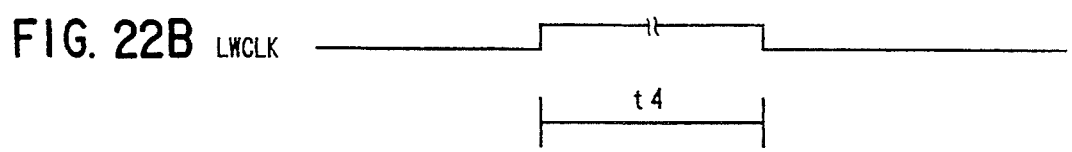
FIG. 22B LWCLK
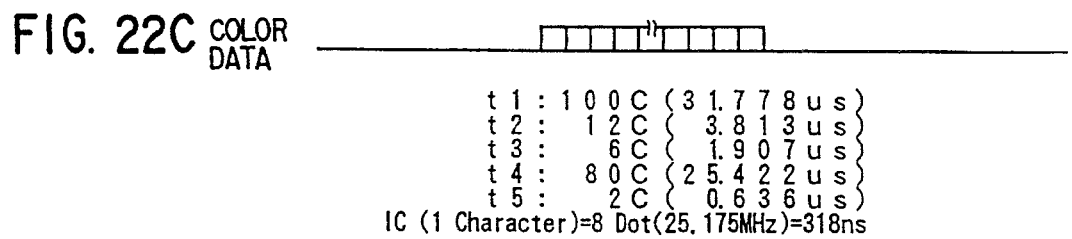
FIG. 22C COLOR DATA
t1 : 100C (31.778 us)
t2 :  12C ( 3.813 us)
t3 :   6C ( 1.907 us)
t4 :  80C (25.422 us)
t5 :   2C ( 0.636 us)
IC (1 Character)=8 Dot(25.175MHz)=318ns
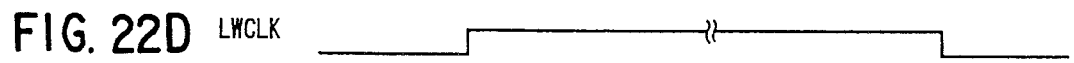
FIG. 22D LWCLK
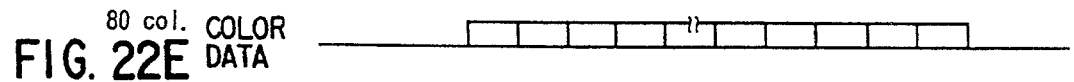
FIG. 22E 80 col. COLOR DATA
FIG. 22F LPCLK
1D=Dot(25.175MHz)=39.7ns
FIG. 22G LWCLK
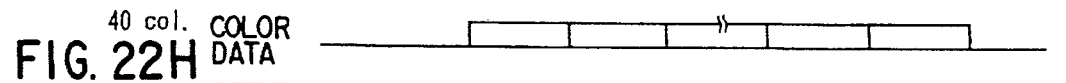
FIG. 22H 40 col. COLOR DATA
FIG. 22I LPCLK
1D=Dot(25.175MHz)=39.7ns 5,559,525

FLAT PANEL DISPLAY CONTROL SYSTEM

This application is a continuation of application Ser. No. 08/229,137, filed Apr. 18, 1994, which is a continuation of application Ser. No. 07/953,152, filed Sep. 29, 1992, both now abandoned.

BACKGROUND OF THE INVENTION

1. Field of the Invention

This invention relates to a flat panel display control system of a portable computer capable of selectively displaying image data supplied from two or more display controllers on the flat panel display apparatus.

2. Description of the Related Art

A conventional lap-top type computer comprises a built-in display controller 1 and a RAMDAC 3 as well as a flat panel display unit 5 such as a liquid crystal display (LCD) unit for visual monitoring, as illustrated in FIG. 25. The image data transmitted from the display controller 1 are converted to video signals by the RAMDAC 3 and fed to the flat panel display unit 5 where they are displayed on the display screen.

Normally, a lap-top type computer is so designed that it can be optionally connected to a color CRT display unit. FIG. 26 illustrates a block diagram of a lap-top computer having a color liquid crystal display unit as a standard component and connectable to a CRT display unit as an optional component. In FIG. 26, a system bus 7 comprises a 24-bit width address bus and a 16-bit width data bus. A video RAM (VRAM) 11 stores display data to be displayed in color on a color CRT display unit 13 or a color LCD panel 15. The VRAM 11 has a memory capacity of 64K×16 bits. A CPU 9 writes the display data in the VRAM 11 by way of a CRT controller 17.

The CRT controller 17 reads the display data from the VRAM 11 and sends the read display data to a display control section 21 and a display data generating section 23 via a display data bus 19.

The display data generating section 23 includes a CRT palette 25A and a Digital-Analog Converter (DAC) 25B. The CRT palette 25A converts the display data transmitted from the CRT controller 17 to color data. The DAC 25B converts the color data into R, G, B analog video signals and feeds them to the color CRT display unit 13. The CRT display unit 13 displays the R, G, B video signals in synchronism with the horizontal synchronizing signal (HSYNC) and the vertical synchronizing signal (VSYNC) 27 sent from the CRT controller 17.

The display control section (DC) 21 comprises: an arithmetic circuit 29 for obtaining gradation parameters of 39 gradations by using given arithmetic formulas and palette data stored in the CRT palette 25A in response to updating of the data stored in the CRT palette 25A; a conversion table 31 for converting gradation parameters into gradation data of 16 gradations; and an LCD palette 33 into which the gradation data generated by the conversion table 31 are set. The LCD palette 33 converts the display data fed from the CRT controller 17 into R, G, B and I data of 4 bits. The operations of such an arithmetic circuit 29 and a conversion table 31 is described in detail, for instance, in U.S. patent application Ser. No. 07/406,066.

The color LCD panel 15 displays an image defined by the R, G, B and I data fed from the digital port of the display control section 21 in synchronism with the HSYNC and VSYNC signals.

Data bus 35 is used for transferring data between the system bus 7 and the display control section 21. The data bus 37 is used for writing color data into the CRT palette 25A.

VGAs (Video Graphics Arrays) have been used as a graphics subsystem of portable computers. A VGA is capable of displaying in high resolution images with 640× 480 pixels and 250 colors on a CRT display unit. Meanwhile, versatile graphical user interfaces (GUI) such as windows and OS/2 presentation managers (PM) have also been developed.

To work such advanced GUI features effectively, it is desirable to use a high resolution graphics subsystem. And also, to open a plurality of windows on a single screen, a high resolution screen is also necessary.

In an attempt to meet such demands in a usual portable computer, there has been developed a portable computer that can be connected with an external display board through a Feature connector 46, as shown in FIG. 27. The display board includes a graphics subsystem and has an ability to display, on a CRT display unit, an image of higher resolution than that displayed by the graphics subsystem incorporated in the computer.

In FIG. 27, a color CRT display unit 49 connected to a CRT connector 47 which is provided on the computer main body displays data fed from a display controller 51 provided in the computer main body. A CRT display unit 55 connected to a CRT connector 53 provided on a display board, which is plugged into an expansion slot of the portable computer, displays data transmitted from the display controllers 51 and 52 in an alternative manner.

Known conventional portable computers to which optional display board can be connected can use only CRT display units as display units.

As the lap-top type or notebook-type portable computer technologically advances and gains popularity, there has arisen a demand for portable computers having a flat panel display unit that can selectively display different image data from a number of graphics subsystems.

Further, in the conventional computer, it is impossible to supply image data from the display controller 52 to the CRT display unit 49 connected to the standard CRT connector 47.

SUMMARY OF THE INVENTION

It is therefore an object of the present invention to provide a system which can selectively display, on a flat panel display unit, image data from a standard graphics subsystem or an optional graphics subsystem.

It is another object of the present invention to provide a portable computer to which an additional graphics subsystem can be attached and being capable of displaying image data from a built-in graphics subsystem and the optional graphics subsystem on a flat panel display unit.

It is still another object of the present invention to provide a portable computer in which image data supplied from an optional graphics subsystem can be displayed on a standard flat panel display device.

It is a further object of the present invention to provide a systems in which data supplied from a plurality of graphics subsystem can be displayed on a flat panel display unit.

To achieve the above objects, a flat panel display control system according to the present invention includes:

a portable computer having a first graphics subsystem (87, 93) for outputting data to be displayed and a flat panel display unit means (91, 95) for displaying the data supplied from the first graphics subsystem (87, 93);

a second graphics subsystem (109–113) to be externally connected to the portable computer, for supplying data to be displayed on the flat panel display unit means (91, 95), to the portable computer;

connectors (103,105) for connecting the second graphics subsystem (109–113) to the portable computer; and a switch circuit (93, 97,101, ZENSEN), connected to the first graphics subsystem (87, 93), the connectors (103, 105) and the second graphics subsystem (109, 111), for supplying the data from either the first graphics subsystem or second graphics subsystems to the flat panel display unit means (91, 95);

wherein the switch circuit (93, 97,101, ZENSEN) supplies the data from the second graphics subsystem (109–113) to the flat panel display unit means (91, 95) when the second graphics subsystem (109–113) is connected to the portable computer.

To achieve the above objects, a portable computer according to the present invention includes:

flat panel display means (91, 95) for displaying images;

a first graphics subsystem (87, 93) for supplying the flat panel display means (91, 95) with color data to be displayed and control signals, and for outputting display data;

a feature connector (103), connected to the first graphics subsystem (87, 93) and connectable to an optional second graphics subsystem (109–113), for supplying the display data and the control signals output from the first graphics subsystem (87, 93) to the second graphics subsystem (109–113);

a Z connector (105), connected to the flat panel display means (91, 95) and connectable to the second graphics subsystem (109–113), for supplying color data and the control signals output from the second graphics subsystem (109–113) to the flat panel display means (91, 95); and switch means (93, 97,101, ZENSEN), connected to the first graphics subsystem (87, 93) and the Z connector (105), for supplying the color data and control signals from either the first graphics subsystem (87, 93) or the second graphics subsystem (109–113).

To achieve the above objects, a display board according to the present invention includes:

a feature connector (103) connectable to an associated connector provided on a portable computer, for receiving display data (P7-0);

converting means (111), connected to the feature connector (103), for converting the display data supplied from the portable computer through the feature connector (103) to color data to be displayed on a flat panel display device;

display controller (109) for outputting color data to be displayed on a flat panel display device;

selector means (113), connected to the converting means (111) and the display controller (109) for outputting the color data supplied from either the converting means (111) or the display controller (109); and a Z connector (105), connected to the selector means (113) and connectable to an associated connector provided on a portable computer, for supplying the color data supplied from the selector means (113) to the portable computer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A and 1B illustrate different parts of a block diagram of a lap-top type portable computer comprising a flat panel display unit and a flat panel display control system according to one embodiment of the present invention;

FIG. 2A is a schematic view of the expansion slot of the portable computer and an LCD display board, which is unique to the embodiment, connected with each other through industry standard connectors, a feature connector, and a Z connector which is also unique to the embodiment;

FIG. 5 is a table of pin assignment for the feature connector;

FIG. 6 is a table of pin assignment for the Z connector;

FIG. 7 is a block diagram of a selector 113;

FIGS. 12A to 12D are timing chars, for one vertical scanning period, respectively of the field pulse signal FP, the line pulse signal LP, the display enable signal FR and the display data P7-0 passing through the feature connector, all in the case where the CRT display board is connected to the feature connector and the display image has a resolution of 640×400 dots or 720×400 dots;

FIGS. 14A to 14C are timing charts, for one horizontal scanning period, respectively of the line pulse signal LP, the display enable signal FR, and the display data P7-0 passing through the feature connector, all in the case where the CRT display board is connected to the feature connector;

FIGS. 14D to 14F are expanded timing charts respectively of the display enable signal FR, the display data P7-0, and the clock signal PCLK passing through the feature connector, all for an 80 column mode;

FIGS. 14G to 14I are expanded timing charts respectively of the display enable signal FR, the display data P7-0, and the clock signal PCLK passing through the feature connector, all for a 40 column mode;

FIGS. 15A to 15D are timing charts, for one vertical scanning period, respectively of a field pulse signal FP, a line pulse signal LP, the display enable signal FR, and the display data P7-0 passing through the feature connector, all in the case where the LCD display board is connected to the Feature and Z connectors and the display image has a resolution of 640×480 dots;

FIGS. 16A to 16D are timing charts, for one vertical scanning period, respectively of the field pulse signal FP, the line pulse signal LP, the display enable signal FR, and the display data P7-0 passing through the feature connector, all in the case where the LCD display board is connected to the Feature and Z connectors and the display image has a resolution of 640×400;

FIGS. 17A to 17D are timing charts, for one vertical scanning period, respectively of the field pulse signal FP, the line pulse signal LP, the display enable signal FR, and the display data P7-0 passing through the feature connector, all in the case where the LCD display board is connected to the Feature and Z connectors and the display image has a resolution of 640×350 dots;

FIGS. 18A to 18C are timing charts, for one horizontal scanning period, respectively of the line pulse signal LP, the display enable signal FR, and the display data P7-0 passing through the feature connector, all in the case where the LCD display board is connected to the Feature and Z connectors;

FIGS. 18D to 18F are expanded timing charts respectively of the display enable signal FR, the display data P7-0 and the clock signal PCLK passing through the feature connector, all for an 80 column mode;

FIGS. 18G to 18I are expanded timing charts respectively of the display enable signal FR, the display data P7-0, and the clock signal PCLK passing through the feature connector, all for a 40 column mode;

FIGS. 19A to 19D are timing charts, for one vertical scanning period, respectively of a field pulse (vertical synchronizing) signal LFP, a line pulse (horizontal synchronizing) signal LLP, a display position (enable) signal LWCLK, and color data passing through the Z connector, in the case where the LCD display board is connected to the Feature and Z connectors and the display image has a resolution of 640×480 dots;

FIGS. 20A to 20D are timing charts, for one vertical scanning period, respectively of the field pulse signal LFP, the line pulse signal LLP, the display position signal LWCLK, and the color data passing through the Z connector, all in the case where the LCD display board is connected to the Feature and Z connectors and the display image has a resolution of 640×400;

FIGS. 21A to 21D are timing charts, for one vertical scanning period, respectively of the field pulse signal LFP, the line pulse signal LLP, the display position signal LWCLK, and the color data passing through the Z connector, all in the case where the LCD display board is connected to the Feature and Z connectors and the display image has a resolution of 640×350 dots;

FIGS. 22A to 22C are timing charts, for one horizontal scanning period, respectively of the line pulse signal LLP, the display position signal LWCLK, and the color data passing through the Z connector, all in the case where the LCD display board is connected to the Feature and Z connectors;

FIGS. 22D to 22F are expanded timing charts respectively of the display position signal LWCLK, the color data, and the video (prime) clock signal LPCLK passing through the Z connector, all for an 80 column mode;

FIGS. 22G to 22I are expanded timing charts respectively of the display position signal LWCLK, the color data, and the clock signal LPCLK passing through the Z connector, all for a 40 column mode;

DETAILED DESCRIPTION OF THE PREFERRED EMBODIMENT

Figure 2B:
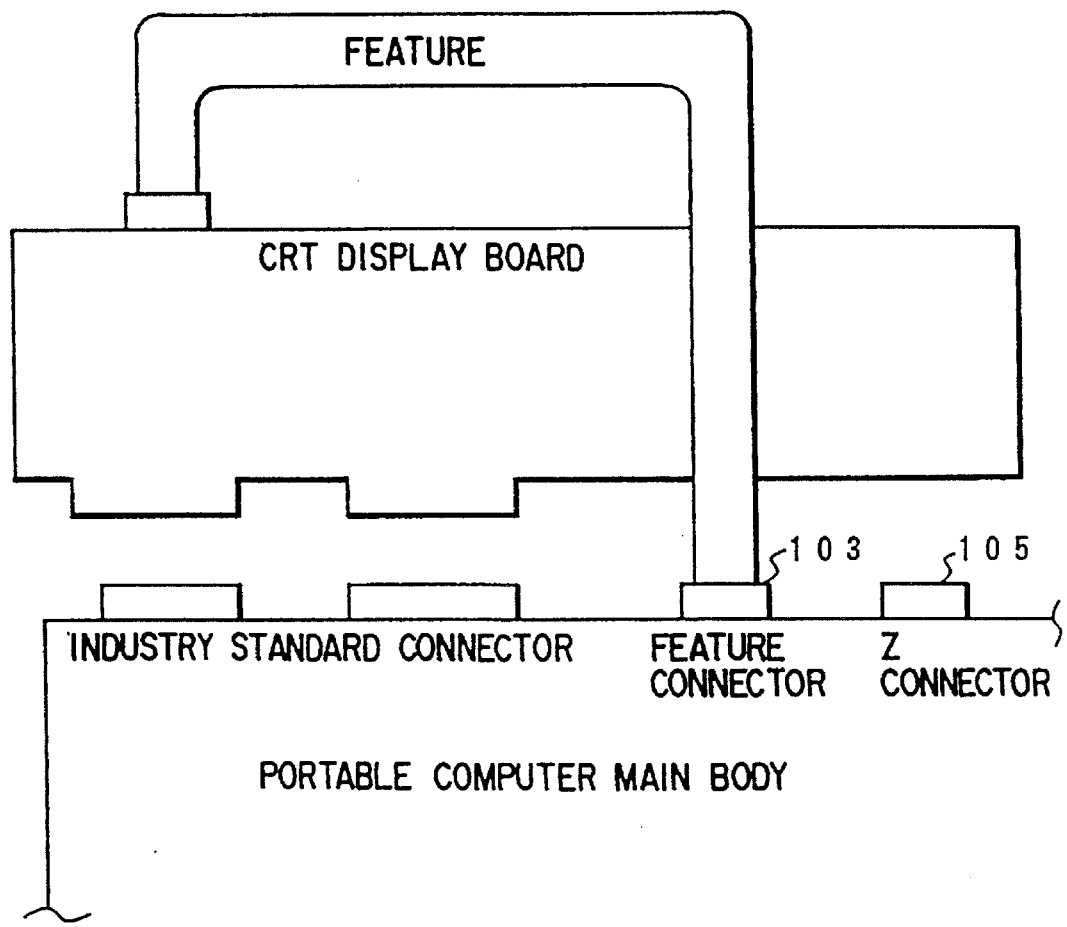
FIG. 2B is a schematic view of the expansion slot of the portable computer and an industry standard CRT display board connected with each other through the industry standard and feature connectors.

One embodiment of the present invention will now be described with reference to the accompanying drawings.

Entire Configuration of the Computer

FIGS. 1A and 1B are parts of a block diagram showing a lap-top type portable computer comprising a flat panel display and a preferred embodiment of the flat panel display control system of the embodiment. In FIGS. 1A and 1B, an element 57 is a central processing unit (CPU) for controlling the entire system of the computer, and an element 59 is a 32-bit width data bus (D31-23, D23-16, D15-8, D7-0). A component 61 is a latch circuit for latching data on the data bus 59 and the component 63 is a memory bus (MD31-24, MD23-16, MD15-8, MD7-0). A component 65 is a system bus comprising a 16-bit data bus (SD15-8, SD7-0) and a 24-bit address bus (LA23-17, SA1919-0. An element 67 is a latch circuit (C-LAT) for latching address data on the address bus (SA19-9, LA23-17) and data on the data bus (SD15-8, SD7-0) 65a. An elements 69 and 71 are internal RAMs comprising dynamic random access memories (DRAMs) and backed up by a battery. An element 73 is a cache memory and an element 75 is an internal ROM (BIOS ROM) for storing a Basic Input and Output System. The BIOS-ROM 75 stores timing data to be set in a CRT controller (to be described later) for CRT display operation.

A component 77 is a timing controller (TC) for controlling the operation timing of the entire system, including the timing of operation of memories. A component 79 is a bus controller (BUS-CNT) for controlling the system bus 65, and a component 81 is a cache memory controller (CMC) for controlling the cache memory 73.

A component 83 is a CGSC-GA (Color Gray Scale Control—Gate Array) for driving a CRT display unit at a high resolution (e.g., horizontal 720 dots) and in a multitude of gradations (e.g., 64 gradations). The CGSC-GA 83 can also drive a function of driving a color LCD panel or unit in 8 gradations. In other words, it is capable of generating intermediate tones by frame-thinning technique and dither technique and also capable of switching the technique used, from frame-thinning to dither technique, or vice versa, depending on the required mode of display. The CGSC-GA 83 is connected to a color CRT display unit by a connector C (not shown).

The component 85 is a display system (BGS) for driving a color LCD panel 91. In this embodiment, the color LCD panel 91 comprises a TFT-LCD (Thin Film Transistor Liquid Crystal Display) panel. The system 85 is connected to the color LCD panel 91 by a connector C2 (not shown). The panel 91 is mounted on the computer main body, as a standardized component thereof and normally connected to the connector C2.

The elements SL1 and SL2 are expansion slots (SLOT-B, SLOT-C) for receiving different expansion boards including display boards (display adapter boards).

Configuration of the Display Control System

Figure 3A:
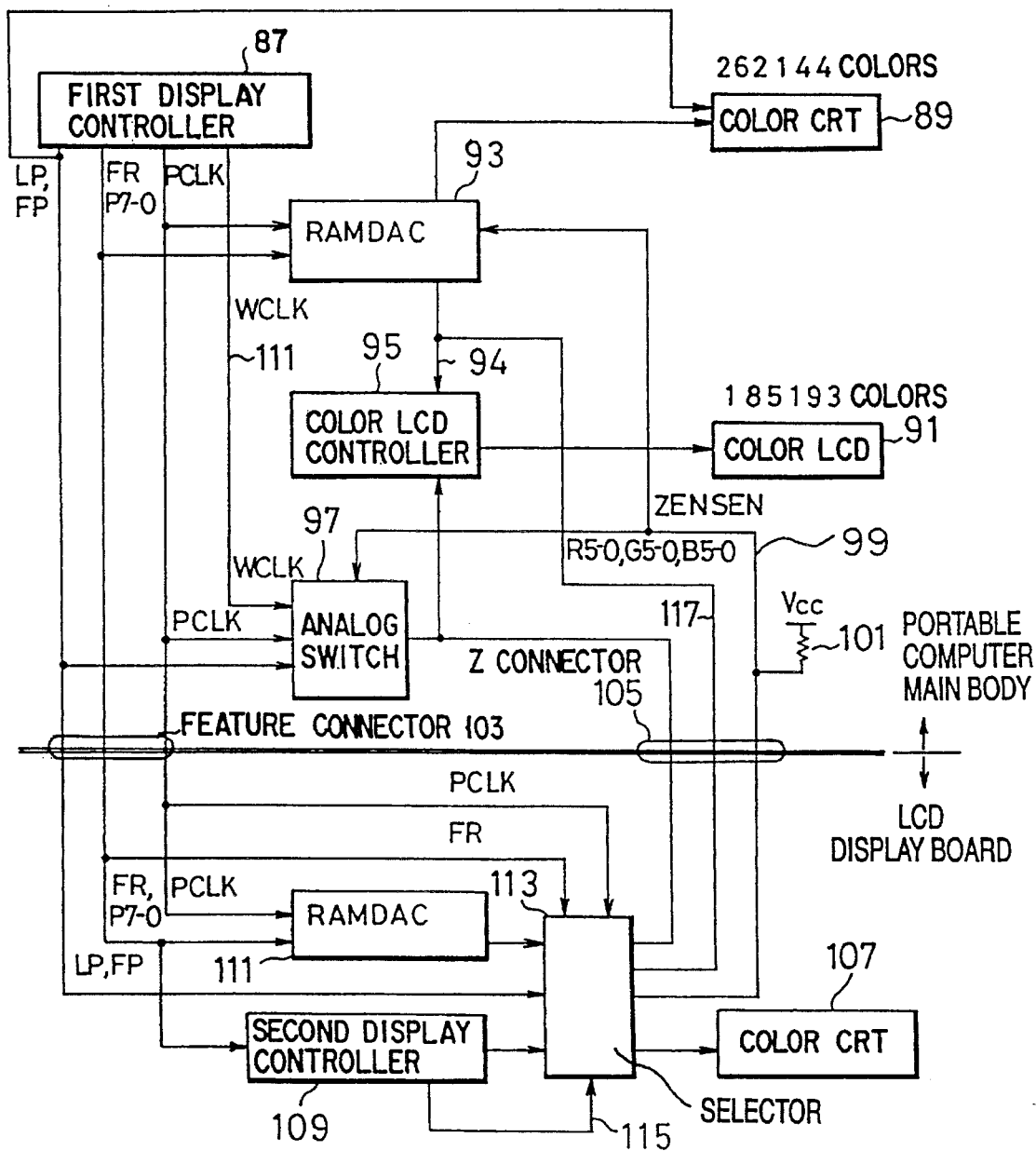
FIG. 3A is a block diagram of the display control system to which the LCD display board is connected.
Figure 3B:
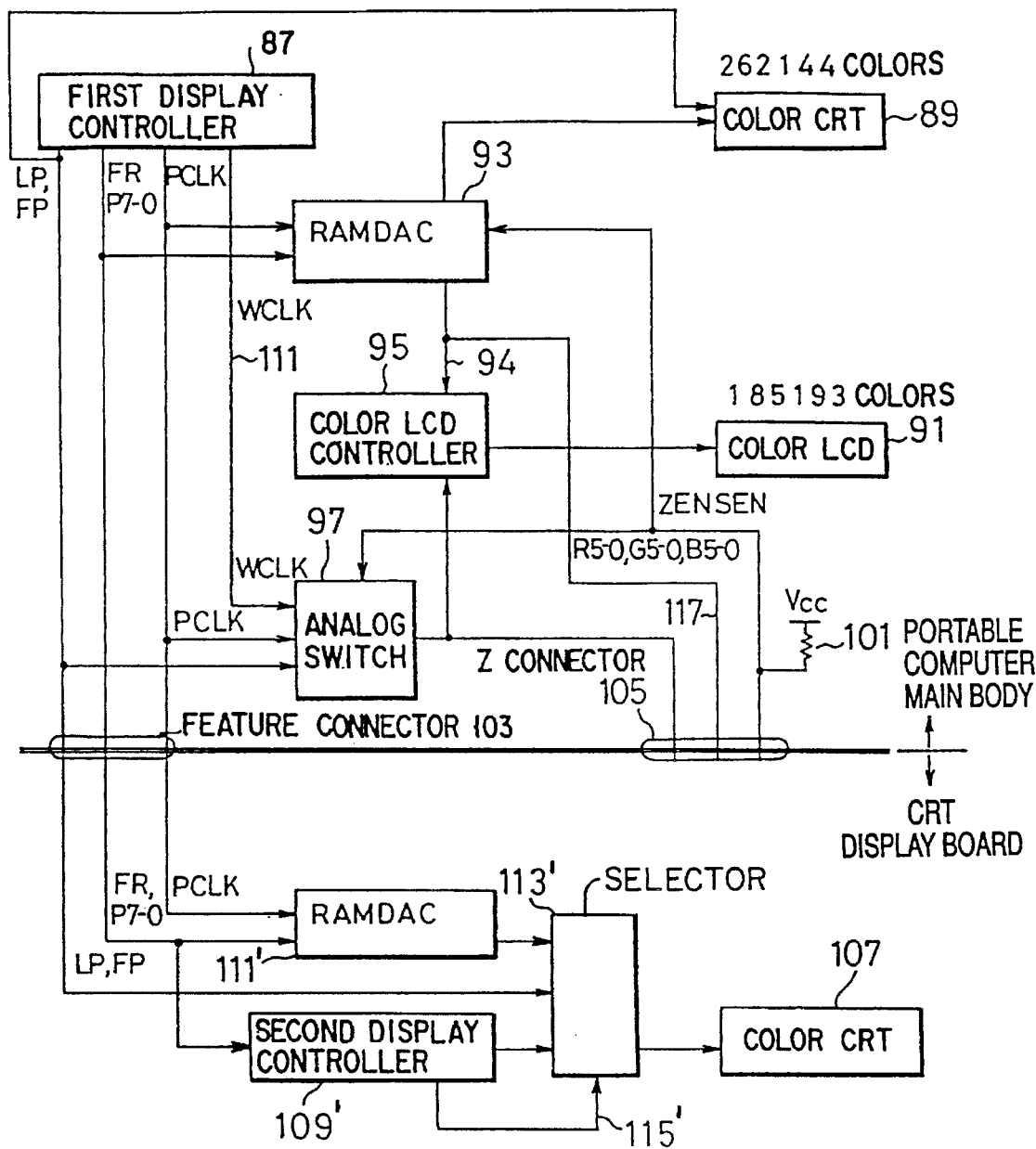
FIG. 3B is a block diagram of the display control system to which the CRT display board is connected.
Figure 4:
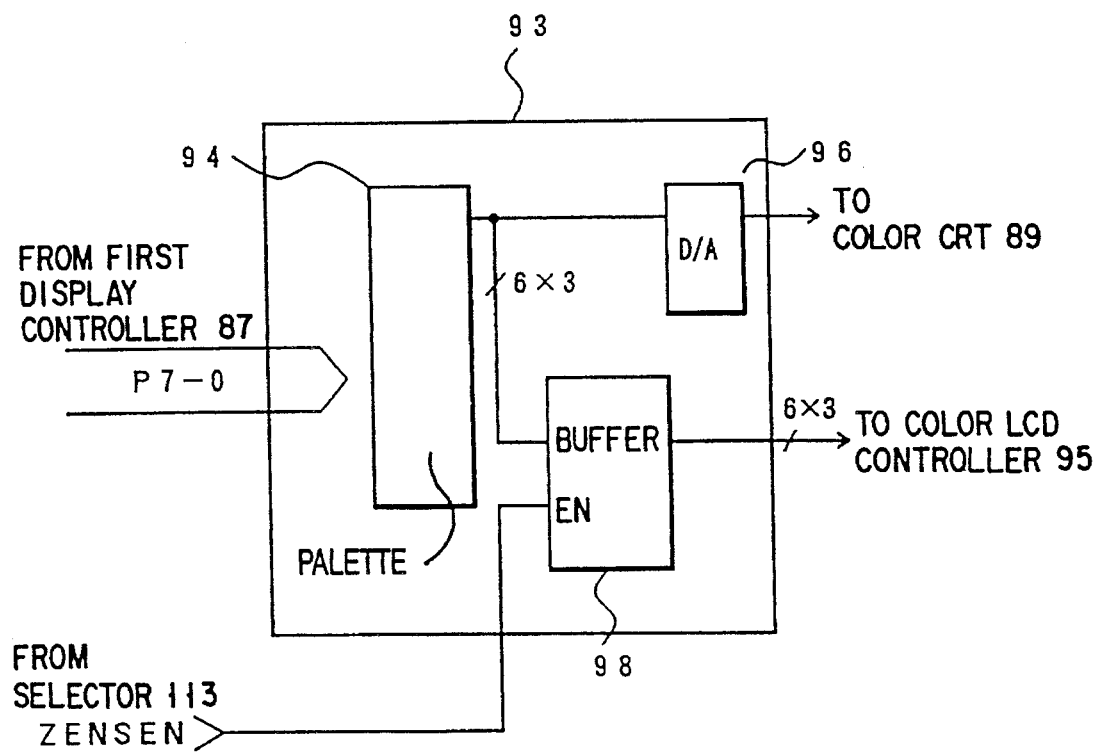
FIG. 4 is a block diagram of the RAMDAC 93.

FIG. 2A shows the state that an LCD display board (a display board for a flat panel display panel) unique to this embodiment is connected to the expansion slot of the computer. FIG. 2B shows the state that a industrial standard CRT display board is connected to the expansion slot of the computer. FIG. 3A is a block diagram of the display control system set in the state shown of FIG. 2A. FIG. 3B is a block diagram of the display control system set in the state of FIG. 2B.

The configuration of the display control system shown in FIG. 3A will now be described.

In FIG. 3A, the first display controller 87 is incorporated in the main body of the portable computer, as a standard component, and outputs display data P7-0 to be displayed on the color LCD panel 91 and also on the color CRT display unit 89 connected to the portable computer as well as control signals LP, FP, FR, PCLK, WCLK. Here, the signal LP is a line pulse signal (horizontal synchronizing signal), the signal FP is a field pulse (vertical synchronizing) signal, the signal FR is a display enable signal, the signal PCLK is a prime clock signal, and the signal WCLK is a signal indicating the display position. The display enable signal FR indicates the effective period of display data. The prime clock signal PCLK, the display enable signal FR and the display data P7-0 transmitted from the first display controller 87 are fed to the RAMDAC 93.

The first display controller 87 generates the signals at the timing for the VGA (common timing for CRT and LCD) when a FEASEN signal (will be described later) is at low level. The first display controller 87 generates the signals at the timing of the standard VGA feature connector (timing for CRT) when the FEASEN signal is at high level.

The RAMDAC 93 comprises a CRT palette 94, a D/A converter 96, and a buffer 98. The CRT palette 94 converts the display data P7-0 transmitted from the first display controller 87 into digital color data R5-0, G5-0, B5-0. The digital color data includes 6-bit data for each of red, green and blue. The buffer 98 transmits the digital color data to a color LCD controller 95 when a ZENSEN signal (will be described later) is at high level. Output terminals of the buffer 98 are set in high impedance state when the ZENSEN signal is at low level. The D/A converter 96 converts the digital color data into analog video signals, which are supplied them to the color CRT display unit 89. The color CRT display unit 89 can display data in 262144 colors.

The first display controller 87 and the RAMDAC 93 constitute a first graphics subsystem (built-in graphics subsystem).

The digital color data R5-0, G5-0, B5-0 transmitted from the RAMDAC 93 are wired-ORed with digital color data supplied from the Z connector 105 and then supplied to the color LCD controller 95.

An analog switch 97 receives the control signals LP, FP, PCLK, and WCLK from the first display controller 87, and outputs them when the ZENSEN signal is at high level. The output terminals of the analog switch 97 are set in a high impedance state when the ZENSEN signal is at low level. The control signals supplied from the analog switch 97 are wired-ORed with control signals supplied from the Z connector 105, and are supplied to the color LCD controller 95.

A color LCD panel 91 is a standard component of the portable computer and connected to the color LCD controller 95. Upon receiving the digital color data R5-0, G5-0, B5-0 and the control signals LP, FP, PCLK, WCLK, the color LCD controller 95 drives the color LCD panel 91.

The ZENSEN signal 99 is pulled up to a Vcc level by the resistor 101. Therefore, it remains at the high level as long as the LCD display board shown in FIGS. 2A and 3A is not connected to the portable computer.

A feature connector 103 is a connector for transferring the data or signals output from the first display controller 87 to the display board inserted into the expansion slot of the portable computer. FIG. 5 shows the pin assignment of the feature connector. As shown in FIG. 5, the first pin is a sense pin. The sense pin is set at the high level when the CRT display board is not connected to the portable computer, whereas it is turned to the low level when the CRT display board is connected to the portable computer as shown in FIGS. 2B and 3B.

The Z connector 105 is used for transferring data or signals output from the LCD display board inserted to the expansion slots of the portable computer. FIG. 6 shows the pin assignment of the Z connector. As shown in FIG. 6, the 33rd pin is a sense pin for transmitting the ZENSEN signal. The ZENSEN signal is set at the high level when the LCD display board is not connected to the portable computer, whereas it is set at the low level when the LCD display board is connected to the portable computer as shown in FIGS. 2A and 3A.

Configuration of the Display Board

The configuration of the display board inserted to the expansion slots will now be described.

First, the LCD display board unique to the present embodiment will be described, which is a second (external or optional) graphics subsystem.

The LCD display board is used for switchingly displaying, on the color LCD panel 91, images defined by data and signals supplied from the first display controller 87 and the LCD display board.

For example, the LCD display board is used to allow displaying, on the color LCD display panel 91, window which is defined by a display controller included in the LCD display board on an image defined by the first display controller 87.

The LCD display board, i.e. the second graphics subsystem includes a second display controller 109, a RAMDAC 111 and a selector 113. The second display controller 109 is typically a display controller having a higher resolution higher than the first display controller 87 (it is not necessarily limited to such a display controller). The second display controller 109 outputs display data to be displayed on the color CRT display unit 107 connected to the LCD display board and the color LCD panel 91. It outputs control signals LP, FP, WCLK, and PCLK, too.

The RAMDAC 111 has a configuration similar to that of the RAMDAC 93. The RAMDAC 111 converts the display data P7-0 transmitted from the first display controller 87 into digital color data in response to the display enable signal FR and the prime clock pulse signal PCLK, and supplies digital color data R5-0, G5-0, B5-0 to the selector 113. Further, the RAMDAC 111 converts the digital color data to analog video signals by DACs, which are supplied to the selector 113.

The selector 113 is connected to the first display controller 87 by the feature connector 103, and to the color LCD controller 95 by the Z connector 105.

As illustrated in FIG. 7, the selector 113, in response to the changeover signal 115 supplied from the second display controller 109, selects (1) either the digital color data supplied from the RAMDAC 111 or the digital color data supplied from the second display controller 109, (2) either the analog video signals supplied from the RAMDAC 111 or the analog video signals from the second display controller 109, and (3) either the control signals coming from the first display controller 87 or the control signals transmitted from the second display controller 109. The selector 113 outputs the selected digital color data and analog video signals. The selector 113 outputs the selected field pulse FP as a field pulse (vertical synchronizing) signal LFP, the selected line pulse LP as a line pulse (horizontal synchronizing signal) LLP, selected prime clock signal PCLK as a video (prime) clock signal LPCLK, and the selected display enable signal RF as a display position (display enable) signal LWCLK.

The selector 113 also outputs the low-level ZENSEN signal indicating the existence of the LCD display board. It should be noted that the FEASEN signal is maintained at high level.

As stated before, the digital color data from the RAMDAC 93 and those from the selector 113 are wired-ORed and fed to the color LCD controller 95. In order to avoid any data collision, the output timing of the color data from the selector 113 is delayed by a given time period relative to the timing at which the ZENSEN signal is turned to the low level. For this purpose, a register 110 and first and second flip-flops 112 and 114 are used in the selector 113 as shown in FIG. 8.

An enable signal is set in the register 110 when the selector 113 is made ready to send control signals in a stable manner. Then, as illustrated in FIG. 9C, this signal is sent as the low level ZENSEN signal. In response to the ZENSEN signal, the RAMDAC 93 stops out-putting the digital color data. The ZENSEN signal is supplied to the selector 113 through the first and second flip flops 112 and 114. As a result, the selector 113 outputs the selected digital color data, analog video signals and control signals at the timing shown in FIG. 9E, which is delayed by two clock periods of the clock PCLK of FIG. 9D.

Figure 9A:
FIGS. 9A through 9E are timing charts respectively of signals on a bus 94, output data of a RAMDAC 93, a ZENSEN signal, a clock signal PCLK and output data of the selector 113.
Figure 9B:
Figure 9C:
Figure 9D:
Figure 9E:

Thus, even if the RAMDAC 93 sends out data A with the timing of FIG. 9B, the data A and the data B do not collide on the bus 94. Outputs terminals of the selector 113 are set to a high impedance state until the enable signal is supplied thereto. Similarly, the control signals from the first display controller 87 and the LCD display board is also avoided.

Figure 8:
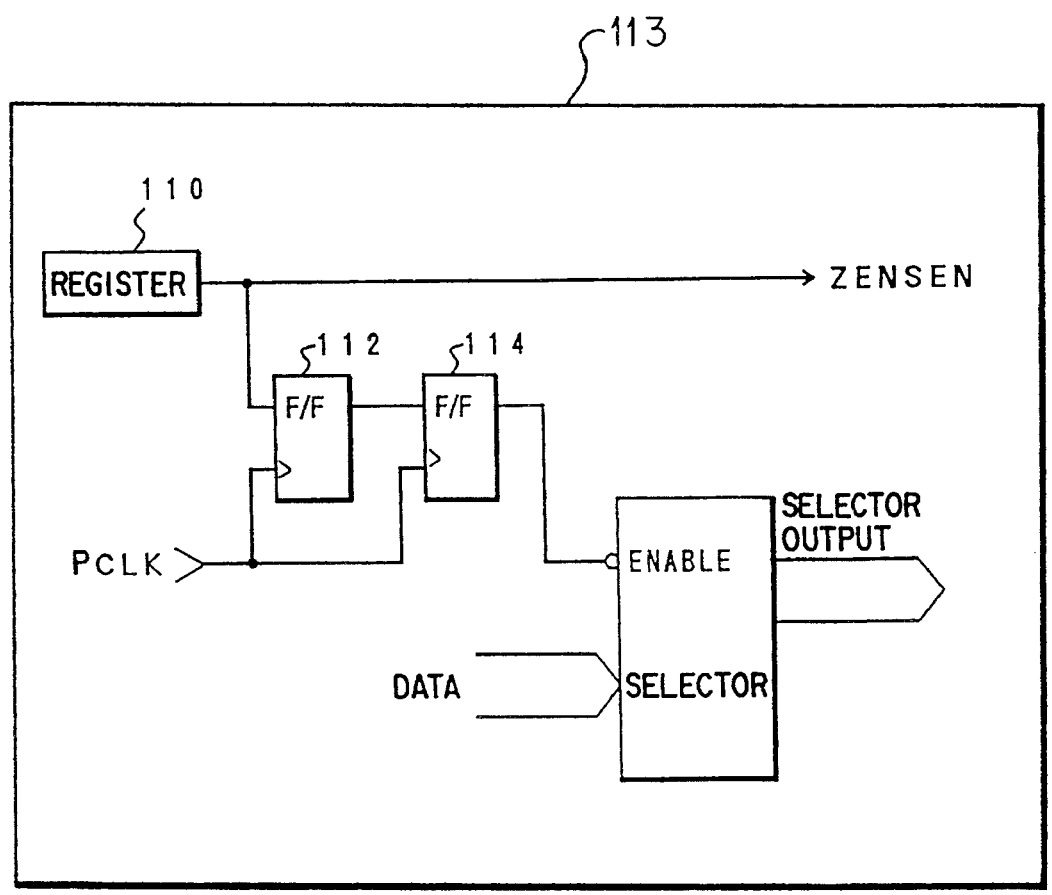
FIG. 8 is a block diagram of a circuit for outputting a ZENSEN signal and enabling the selector 113.
Figure 10:
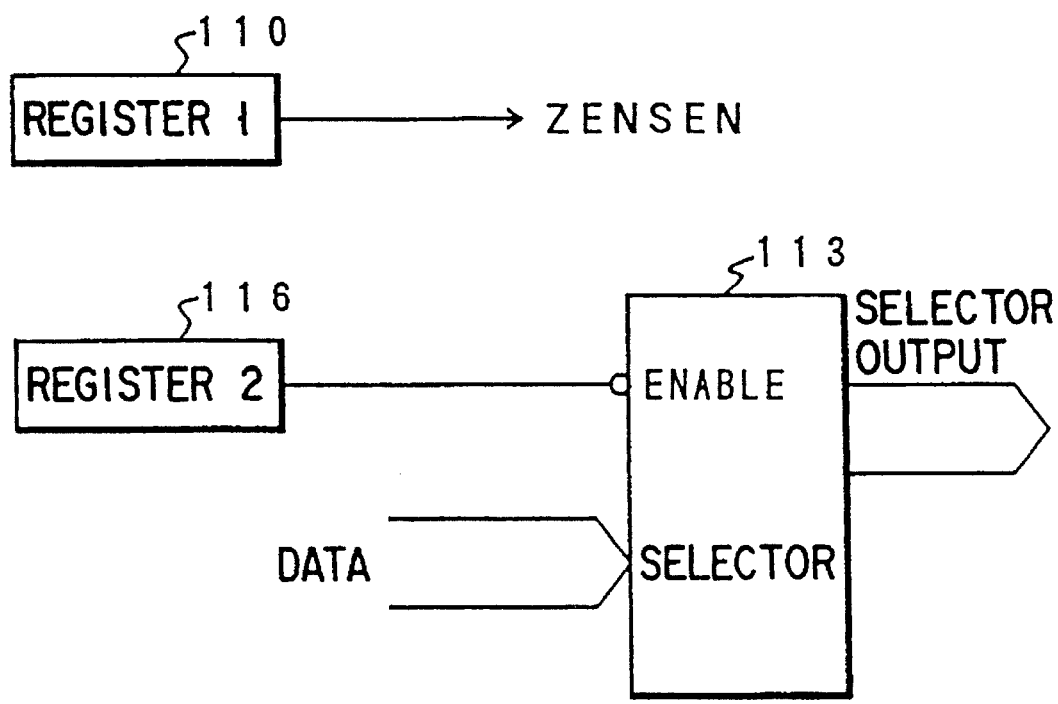
FIG. 10 is a block diagram of an alternative circuit of the circuit shown in FIG. 8.
Figure 11A:
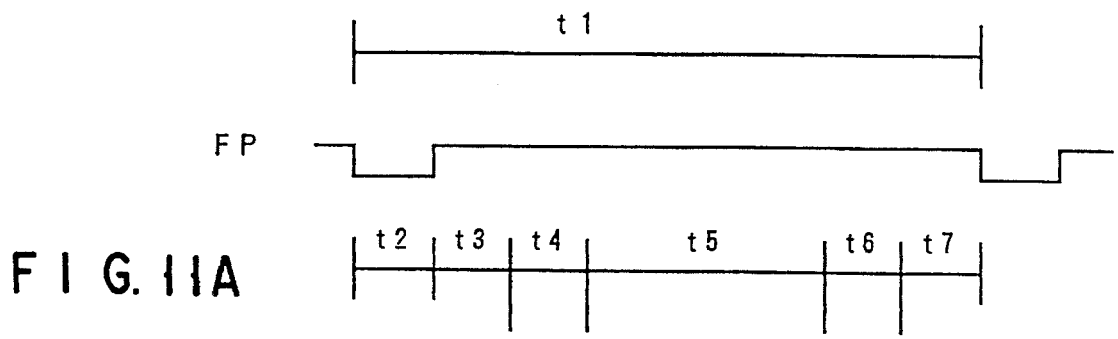
FIGS. 11A to 11D are timing charts, for one vertical scanning period, respectively of a field pulse (vertical synchronizing) signal FP, a line pulse (horizontal synchronizing) signal LP, a display enable signal FR and display data P7-0 passing through the feature connector, all in the case where the CRT display board is connected to the feature connector and the display image has a resolution of 640×480 dots.
Figure 11B:
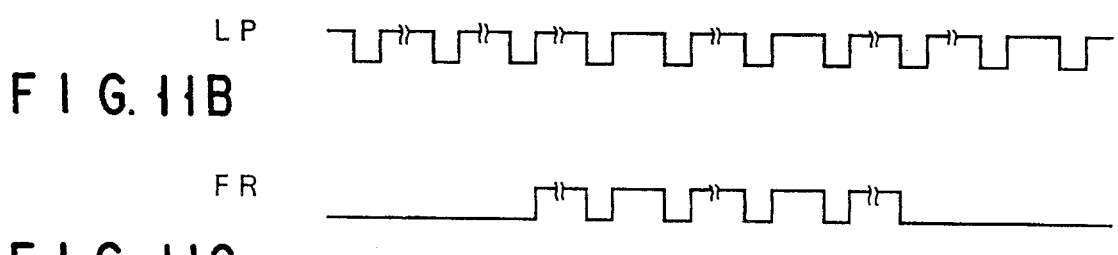
Figure 11C:
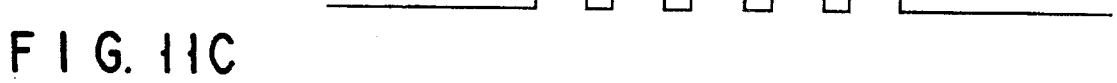
Figure 11D:
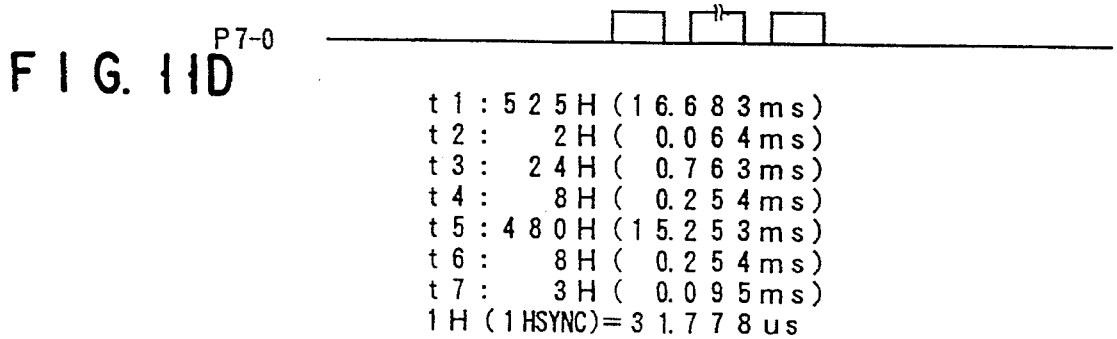
Figure 13A:
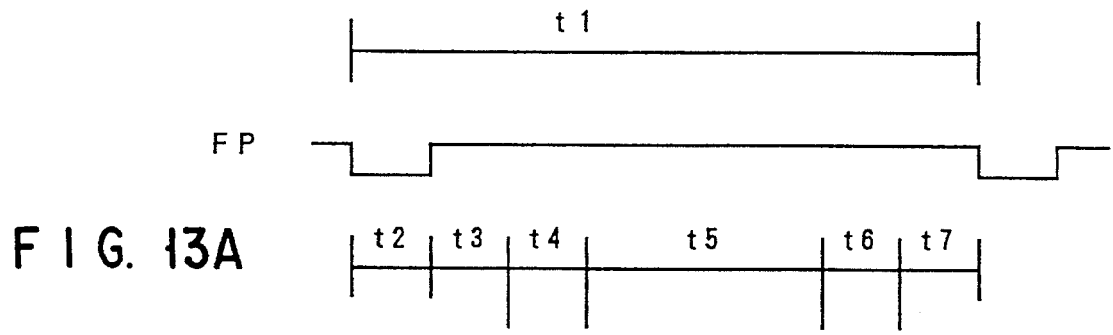
FIGS. 13A to 13D are timing charts, for one vertical scanning period, respectively of the field pulse signal FP, the line pulse signal LP, the display enable signal FR and the display data P7-0 passing through the feature connector, all in the case where the CRT display board is connected to the feature connector and the display image has a resolution of 640×350 dots or 720×350 dots.
Figure 13B:
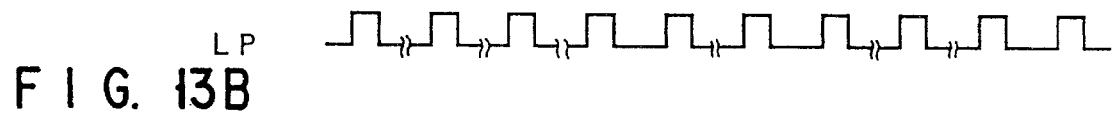
Figure 13C:
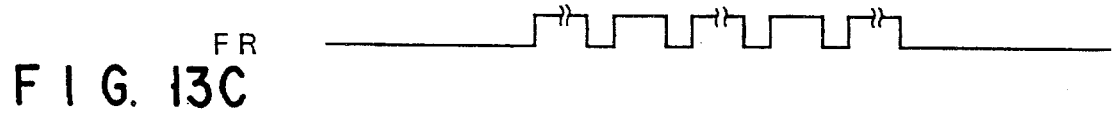
Figure 13D:
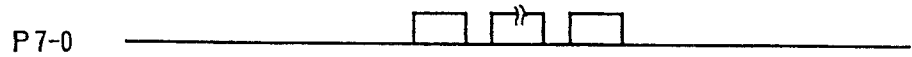

Note that the circuit of FIG. 8 may be so modified as to provide a first register 110 for storing a ZENSEN signal and a second register 116 for storing an enable signal as illustrated in FIG. 10. The ZENSEN signal and the enable signal are set by, for example, the software in the register 110 and 116, respectively.

More specifically, an initializing routine for initializing the display board is executed after the portable computer is turned on and the selector outputs a correct control signal after the completion of the initializing routine. At this moment, the active low level signals are set to the registers 110 and 116 by a program.

Next, the configuration of the CRT display board will be described.

The CRT display board is used for switchingly displaying, on the color CRT display unit 107, the images defined by data and signals supplied from the first display controller 87 and the CRT display board.

For example, the CRT display board enables the color CRT display unit 107 to display window which is defined by a display controller included in the CRT display board on an image defined by the first display controller 87.

The CRT display board comprises a second display controller 109', a RAMDAC 111', and a selector 113'. The second display controller 109' outputs the analog video signals to be displayed on the color CRT display unit 107 connected to the CRT display board, and also outputs the control signals. The RAMDAC 111' converts the display data P7-0 transmitted from the first display controller 87 into the analog video signals, which are supplied to the selector 113'.

In response to the changeover signal 115' supplied from the second display controller 109', the selector 113' selects (1) either the analog video signals supplied from the RAMDAC 111' or the analog video signals from the second display controller 109', and (2) either the control signals coming from the first display controller 87 or the control signals transmitted from the second display controller 109'. The selected signals are supplied to the color CRT display unit 107. The CRT display board has a circuit for setting the feasen signal at a low level.

Operation

First, the general operation of the first display controller 87 and the CRT and LCD display boards will be described with reference to FIGS. 11A to 22I.

FIGS. 11A to 14I are timing charts of signals output from the first display controller 87 and passing through the feature connector 103 when the CRT display board is connected to the feature connector 103 (the "FEASEN" pin of FIG. 5 being grounded).

Of these figures, FIGS. 11A to 11D are timing charts, for one vertical scanning period, respectively of the field pulse (vertical synchronizing) signal FP, the line pulse (horizontal synchronizing) signal LP, the display enable signal FR and the display data P7-0, all in the case where the display image has a resolution of 640×480 dots.

FIGS. 12A to 12D are timing charts of the field pulse signal FP, the line pulse signal LP, the display enable signal FR, and the display data P7-0, all in the case where the display image has a resolution of 640×400 dots or 720×400 dots.

FIGS. 13A to 13D are timing charts, for one vertical scanning period, respectively of the field pulse signal FP, the line pulse signal LP, the display enable signal FR, and the display data P7-0, all in the case where the display image has a resolution of 720×350 dots.

FIGS. 14A to 14C are timing charts, for one horizontal scanning period, of the line pulse signal LP, the display enable signal FR and the display data P7-0. FIGS. 14D to 14F are expanded timing charts of the display enable signal FR, the display data P7-0 and the clock PCLK in the 80 column mode. Similarly, FIGS. 14G to 14I are expanded timing charts of the display enable signal FR, the display data P7-0 and the clock PCLK in the 40 column mode.

FIGS. 15A to 18I are timing charts of signals output from the first display controller 87 and passing through the feature connector 103, in the case where the LCD display board is connected to the feature connector 103 and the Z connector 105 (the FEASEN signals are grounded and ZENSEN signal is grounded).

Of these figures, FIGS. 15A to 15D are timing charts, for one vertical scanning period, respectively of the field pulse signal FP, line pulse signal LP, the display enable signal FR, and the display data P7-0, all in the case where the display image has a resolution of 640×480 dots.

FIGS. 16A to 16D are timing charts of the field pulse signal FP, the line pulse signal LP, the display enable signal FR, and the display data P7-0, in the case where the display image has a resolution of 640×400 dots or 720×400 dots.

Further FIGS. 17A to 17D are timing charts of the field pulse signal FP, the line pulse signal LP, the display enable signal FR and the display data P7-0, all in the case where the display image has a resolution of 640×350 dots or 720×350 dots.

FIGS. 18A to 18C are timing charts, for one horizontal scanning period, of the line pulse signal LP, the display enable signal FR, and the display data P7-0.

FIGS. 18D to 18F are expanded timing charts of the display enable signal FR, the display data P7-0, and the clock PCLK in the 80 column mode. Similarly, FIGS. 18G to 18I are expanded timing charts of the display enable signal FR, the display data P7-0, and the clock PCLK, all in the 40 column mode.

FIGS. 19A to 22I are timing charts of signals output from the LCD display board and passing through the Z connector 105 (the signals output from the selector 113), in the case where the LCD display board is connected to the Feature connector 103 and the Z connector 105.

Of these figures, FIGS. 19A to 19D are timing charts, for one vertical scanning period, respectively of the field pulse signal LFP, line pulse signal LLP, the display position signal LWCLK, and the digital color data, in the case where the display image has a resolution of 640×480 dots.

FIGS. 20A to 20D are timing charts of the field pulse signal LFP, the line pulse signal LLP, the display position signal LWCLK, and the digital color data, all in the case where the display image has a resolution of 640×400 dots or 720×400 dots.

FIGS. 21A to 21D are timing charts of the field pulse signal LFP, the line pulse signal LLP, the display position signal LWCLK, and the digital color data, all in the case where the display image has a resolution of 640×350 dots or 720×350 dots.

FIGS. 22A to 22C are timing charts, for one horizontal scanning period, of the line pulse signal LLP, the display position signal LWCLK and the digital color data. FIGS. 22D to 22F are expanded timing charts of the display position signal LWCLK, the digital color data, and the clock LPCLK, all in the 80 column mode. Similarly, FIGS. 22G to 22I are expanded timing charts of the display position signal LWCLK, the digital color data, and the clock PCLK, all in the 40 column mode.

The specific operation of the display control system will be described.

(I) The operation performed when no display board (second graphics subsystem) is not connected to the portable computer:

The FEASEN pin of the feature connector 103 is at high level. Therefore, the first display controller 87 outputs the signals at the timings shown in FIGS. 11A to 14I.

The ZENSEN signal is maintained at high level by the pull up resistor 101. In response to the ZENSEN signal, the analog switch circuit 97 supplies the control signals LP, FP, PCLK, LWCLK supplied from the first display controller 87 to the color LCD controller 95. In response to the ZENSEN signal, RAMDAC 93 converts the display data P7-0 to the digital color data R5-0, G5-9, and B5-0 and supplies the digital color data to the color LCD controller 95 through the bus 94. The color LCD controller 95 drives the color LCD panel 91 based on the digital color data and the control signals. In other words, the color LCD controller 95 displays the image defined by the display data P7-0 from the first graphics subsystem on the color LCD panel 91.

The line pulse signal LP and field pulse signal FP are also supplied to the color CRT display unit 89. The RAMDAC 93 converts the color display data P7-0 fed from the first display controller 87 into analog video signals, which are supplied to the color CRT display unit 89. The color CRT display unit 89 displays an image in response to the control signals LP and FP and the analog video signal.

(II) In the case where the LCD display board is connected to the computer main body as shown in FIGS. 2A and 3A:

The display controller 87 outputs signals at the timings (timings common for the CRT and LCD) shown in 10 FIGS. 15A to 18I.

The display data P7-0 and the control signals PCLK and FR from the first display controller 87 are fed to the RAMDAC 111. The RAMDAC 111 outputs the digital color data and the analog video signals to the selector 113. The control signals LP, FP, FR and PCLK from the first display controller 87 are also supplied to the selector 113.

The digital color data, the control signals LP, FP, PCLK and FR, and the analog video signal from the second display controller 109 are fed to the selector 113. The control signals LP and FP from the first display controller 87 are sent to the selector 113, too.

(a) In case where the changeover signal 115 from the second display controller 109 indicates selection of the signals from the first graphics subsystem:

The selector 113 selects the digital color data and the analog video signals from the RAMDAC 111, as well as the control signals from the first display controller 87. The digital color data output from the selector 113 is fed to the color LCD controller 95 through the Z connector 105 and the bus 94. The analog video signals transmitted from the selector 113 is supplied to the color CRT display unit 107. The control signals output from the selector 113 are supplied to the color LCD controller 95 through the Z connector and the color CRT display unit 107.

As a result, the image defined by the signals output from the first display controller 87 is displayed on the color LCD panel 91 and the color CRT display unit 107. The color CRT display unit 89 also displays the image in response to the control signal FP and LP, and analog video signal supplied from the RAMDAC 93.

(b) In case where the changeover signal 115 indicates selection of the signals from the second display controller 109:

The selector 113 selects the digital color data, the analog video signals and the control signals from the second display controller 109. The digital color data output from the selector 113 is fed to the color LCD controller 95 through the Z connector 105 and the bus 94. The analog video signals transmitted from the selector 113 are supplied to the color CRT display unit 107. The control signals output from the selector 113 are supplied to the color LCD controller 95 through the Z connector and the color CRT display unit 107.

As a result, the image defined by the signals output from the second display controller 109 is displayed on the color LCD panel 91 and the color CRT display unit 107. On the other hand, the color CRT display unit 89 displays the image defined by the signals output from the first display controller 87 in response to the control signal FP and LP, and analog video signals supplied from the RAMDAC 93.

The selector 113 outputs the digital color data and the control signals upon lapse of a predetermined period of time after the ZENSEN signal has fallen to the low level and the digital output terminals of the RAMDAC 93 and the output terminals of the analog switch 97 have been set in the high impedance state. Thus, a collision of the digital color data from the RAMDAC 93 and from the selector 113 on the bus 94 can be avoided. Similarly, any collision of the control signals from the analog switch 97 and the control signals from the selector 113 can be prevented from colliding.

(III) In the case where the CRT display board is connected to the computer main body as shown in FIGS. 2B and 3B.

The first display controller 87 outputs signals at the timings (timings for the CRT) shown in FIGS. 11A through 14I.

The display data P7-0 and the control signals PCLK and FR from the first display controller 87 are fed to the RAMDAC 111' through the feature connector 103. The RAMDAC 111' outputs the analog video signals to the selector 113'. The control signals from the first display controller 87 are also supplied to the selector 113'. Similarly, the control signals and the analog video signal from the second display controller 109' are fed to the selector 113', too.

(a) In the case where the changeover signal 115' from the second display controller 109' indicates selection of the signals from the first display controller 87:

The selector 113' selects the analog video signal from the RAMDAC 111' as well as the control signals from the first display controller 87. The analog video signals and control signals output from the selector 113' are supplied to the color CRT display unit 107.

As a result, the image defined by the signals output from the first display controller 87 is displayed on the color CRT display unit 107. The color CRT display unit 89 also displays the image defined by the signals output from the first display controller 87.

(b) In the case where the changeover signal 115' indicates selection of the signals from the second display controller 109':

The selector 113' selects the analog video signals and the control signals from the second display controller 109'. The signals selected the selector 113' are supplied to the color CRT display unit 107. As a result, an image defined by the signals output from the second display controller 109' is displayed on the color CRT display unit 107. On the other hand, the color CRT display unit 89 displays the image defined by the signals output from the first display controller 87.

Figure 24A:
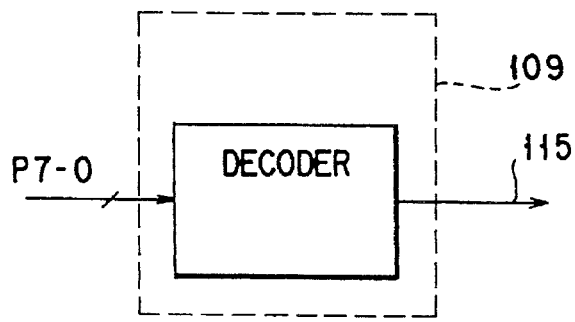
FIG. 24A is a block diagram of a circuit for generating changeover signal 115 and 115'.
Figure 24B:
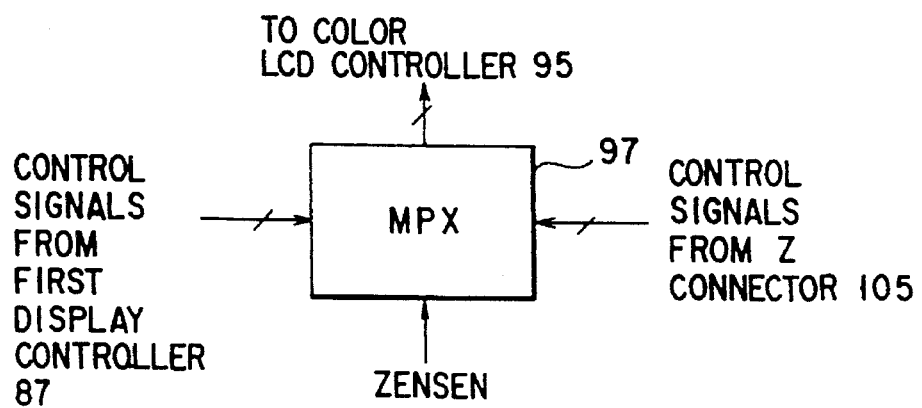
FIG. 24B is a block diagram of a modified analog switch 97.
Figure 25:
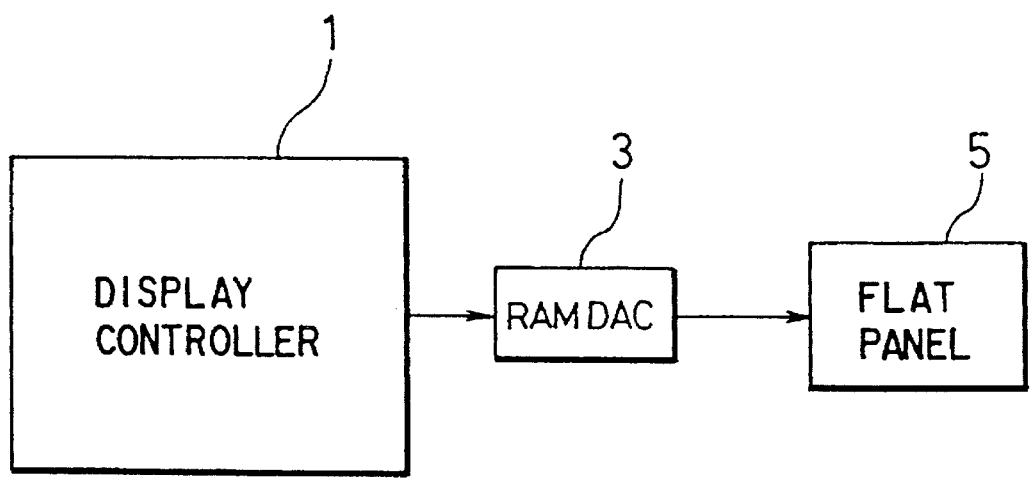
FIG. 25 is a block diagram illustrating a conventional system for controlling a color LCD panel.
Figure 26:
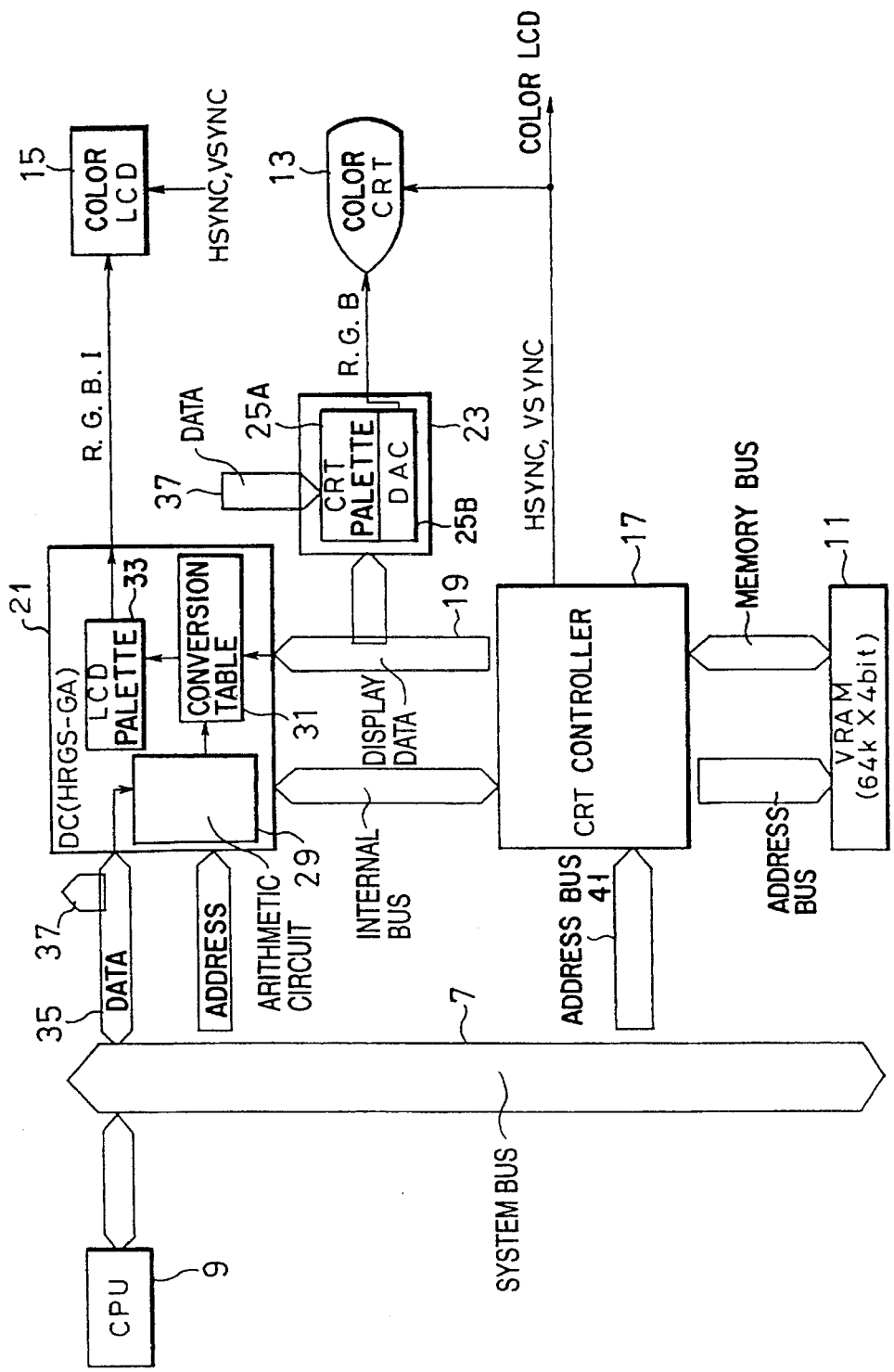
FIG. 26 is a block diagram illustrating the configuration of a conventional CRT drive system.
Figure 27:
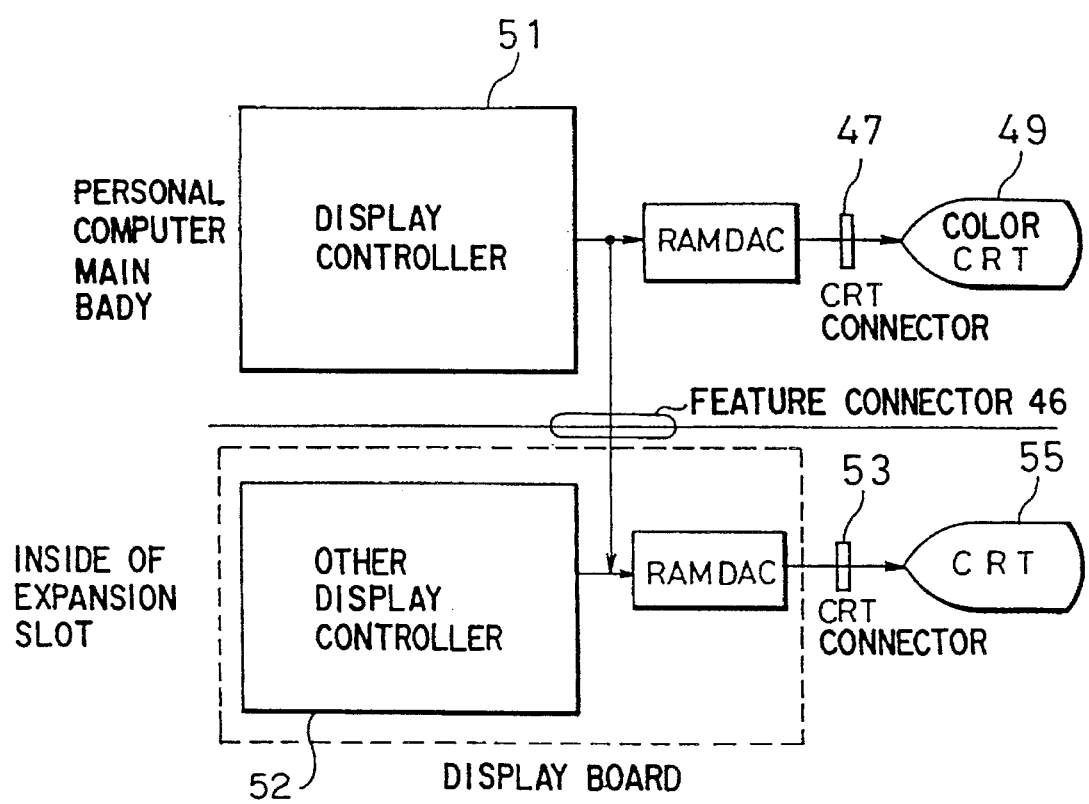
FIG. 27 is a block diagram illustrating the conventional CRT drive system including an external or optional CRT display board.

The changeover signal 115 and 115' are generated, for example, by a decoder 109A used in the second display controller 109 and 109' shown in FIG. 24A. The decoder 109A decodes the display data P7-0 and output the changeover signal indicating the selection of the signals supplied from the second display controller 109 or 109' when the display data P7-0 has a specific value.

The portable computer of the present invention may have an auto-display-off functions. The auto-display-off function is effective even if the LCD display board are connected to the portable computer.

Figure 23A:
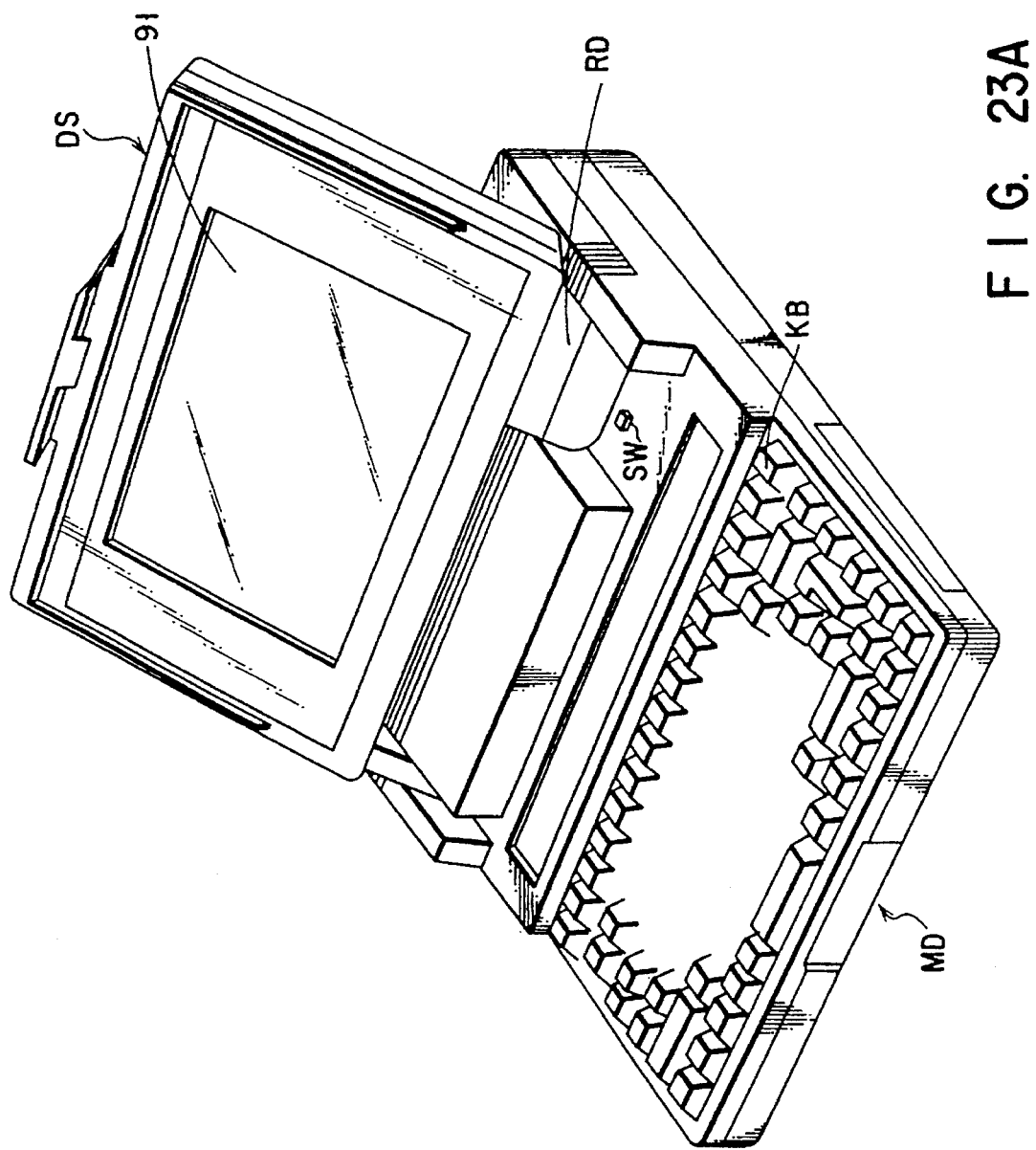
FIG. 23A shows an appearance of the lap-top computer according to the one embodiment of the present invention.

More specifically, the portable computer has a main body MD and a display section DS including the color LCD panel 91. The display section DS is rotatablly supported by a supporting section RD. The main body MD has the keyboard KB and a switch SW for detecting that the display section DS is closed to face the keyboard KB. In the practical manner, the switch SW is provided in the supporting section RD, but, for easy understanding, it is shown on the upper surface of the main body MD in FIG. 23A.

Figure 23B:
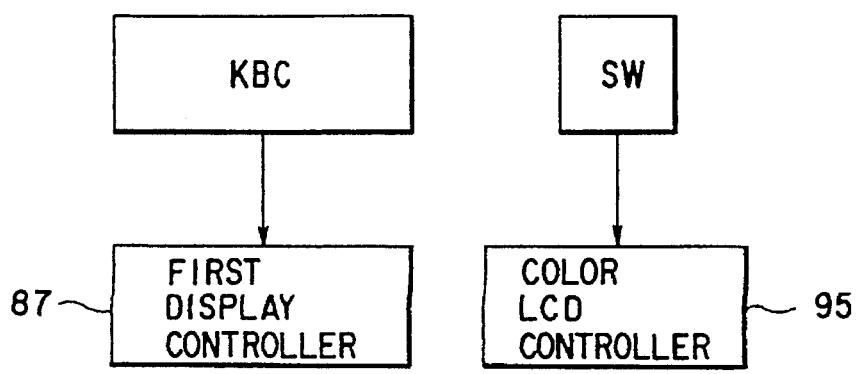
FIG. 23B is a block diagram of a circuit for realizing an auto-display-off function.

If keyboard KB is not operated for a predetermined period, for example, five minutes, the keyboard controller KBC detects this and supplies a signal to the first display controller 87 as shown in FIG. 23B. In response to the signal, the first display controller 87 stops the control operation, and the display units 89, 91, and 107 stop displaying the image.

When the display section DS is closed, the switch SW turns on and supplies a signal to the color LCD controller 95. The color LCD controller 95 stops controlling the color LCD panel 91, which stops displaying the image.

The present invention is not limited to the above embodiment and many modifications may be made thereto. For instance, in this embodiment, the first graphics subsystem is a VGA controller and the second graphics subsystem is a display controller having a degree of resolution equal to or higher than that of VGA, they may not necessarily be so. The pin assignments shown in FIGS. 5 and 6 and their timing charts shown in FIGS. 11A to 22I are shown only as examples.

A TFT color LCD panel is used for the flat panel display unit in the above embodiment, a flat panel display unit of other type such as a TN (Twisted Nematic) LCD panel, STN (Super Twisted Nematic) LCD panel, plasma display panel may be used.

As described above in detail, according to the present invention, a portable computer including a flat panel display unit used as a standard component has connectors to be connected to an LCD panel and a switching circuit for switchingly supplying the data and signals supplied from the built-in first graphics subsystem and the second graphics subsystem externally attached to the computer. Unless the second graphics subsystem is connected to the computer, the switching circuit supplies the data and signals from the first graphics subsystem and the LCD panel displays an image defined by the first graphics subsystem. If the second graphics subsystem is connected to the computer, the switching circuit transfers the data and signals from the second graphics subsystem to the LCD controller, thus, the LCD panel displays an image defined by the data and signals from the display second controller.

As a result, images defined by data and signals supplied from the different graphics subsystem can be displayed on a flat panel display unit switchingly or alternatively.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A flat panel display control system comprising:

a portable computer having a first graphics subsystem for generating first data to be displayed and flat panel display means for displaying the first data supplied from the first graphic subsystem, the first graphics subsystem including:

a first display controller for outputting the first data and first control signals;

first converting means for converting the first display data to first color data;

a second graphics subsystem generates second control signals and second color data;

connector means, connecting the second graphics subsystem to the portable computer, for supplying the first data from the first graphics subsystem to the second graphics subsystem, and for supplying the second data from the second graphics subsystem to the flat panel display means, wherein the flat panel display means selectively displays the first data supplied from the first graphics subsystem or the second data supplied from the second graphics subsystem, the second graphics subsystem including:

second display means for generating the second color data and the second control signals, the second display means generating a changeover signal when the first display data supplied from the first display controller has a specific value; and selector means for selecting, in response to the changeover signal, the second color data and the second control signals from the second display means and for supplying the selected second color data and the second control signals to the portable computer through the connector means to display the second color data on the flat panel display means.

2. The flat panel display control system according to claim 1, further comprising initializing means for initializing the second graphics subsystems;

wherein when the second graphics subsystem is connected to the portable computer, the second graphics subsystem starts supplying the second data only after the second graphics subsystem is initialized by the initializing means.

3. The flat panel display control system according to claim 1, further comprising auto-display-off means for realizing an auto-display-off function; and means for enabling the auto-display-off means when the second graphics subsystem is connected to the portable computer.

4. The flat panel display control system according to claim 3, wherein the portable computer includes input means for inputting data and a display section rotatably mounted on a portable computer main body and including the flat panel display means, and the auto-display-off means includes means for turning off the flat panel display means when no data is input from the input means for a predetermined period of time or the display section is closed.

5. The flat panel display control system according to claim 1, wherein the flat panel display means includes one of a twisted nematic liquid crystal display panel, a super twisted nematic liquid crystal display panel, a thin film transistor liquid crystal display panel, and a plasma display panel.

6. The flat panel display control system according to claim 1, wherein the flat panel display means includes a flat panel display device and a driver, responsive to a wired-OR operation on the first and second color data, for driving the flat panel display device.

7. The flat panel display control system according to claim 1, wherein each of the first and second graphics subsystems includes means for outputting analog video signals for a CRT.

8. The flat panel display control system according to claim 7, wherein the flat panel display means and the CRT simultaneously display the second color data.

9. The flat panel display control system according to claim 1, wherein the first graphics subsystem comprises:

means, connected to the connector means, the flat panel display means, and output terminals of the first converting means, for performing a wired-OR operation on the first control signals supplied from the first converting means and the second control signals supplied from the second graphics subsystem and supplying a result as color data; and means, connected to the connector means and the first converting means, for setting the output terminals of the first converting means at a high impedance, when the second graphics subsystem generates the changeover signal.

10. The flat panel display control system according to claim 1, wherein the connector means includes:

a first connector for supplying the first data from the first graphics subsystem to the second graphics subsystem; and a second connector for supplying the second data from the second graphics subsystem to the flat panel display means.

11. The flat panel display control system according to claim 1, wherein the second graphics subsystem further includes second converting means for converting the first display data supplied via the connector means to third color data, wherein said selector selects the third color data and the first control signals when the changeover signal is absent.

12. A portable computer comprising:

flat panel display means for displaying images;

a first graphics subsystem for supplying, to the flat panel display means, first display data to be displayed and first control signals, and for outputting the first display data and first control signals;

a second graphics subsystem to be externally connected to the portable computer for supplying an optional display device with second color data to be displayed and second control signals and for generating third color data from the first display data;

connector means, connected to the first graphics subsystem and connectable to the second graphics subsystem, for supplying the first display data and the first control signals output from the first graphics subsystem to the second graphics subsystem, and for supplying the second or the third color data and the first or second control signals output to the flat panel display means, wherein the second graphics subsystem generates a changeover signal when the first display data supplied through the connector means from the first graphics subsystem has a specific value; and selector means for selecting, in response to the changeover signal, the second color data and the second control signals supplied from the second graphics subsystem and for supplying the selected second color data and the selected second control signals to the flat panel display means through the connector means.

13. The flat panel display control system according to claim 12, wherein the first graphics subsystem comprises:

a display controller for outputting the first display data and the first control signals;

converting means for converting the first display data into first color data;

means, connected to the connector means, the flat panel display means, and output terminals of the converting means, for performing a wired-OR operation on the first color data and either one of the second and the third color data and for outputting a result as a fourth color data; and means, connected to the connector means and the converting means, for setting the output terminals of the converting means at a high impedance, when the second graphics subsystem generates the changeover signal.

* * * * *